US012616561B2

(12) United States Patent
Wagner

(10) Patent No.: US 12,616,561 B2
(45) Date of Patent: May 5, 2026

(54) VIBRATION ISOLATOR FOR ORAL IRRIGATORS

(71) Applicant: WATER PIK, INC., Fort Collins, CO (US)

(72) Inventor: Robert D. Wagner, Fort Collins, CO (US)

(73) Assignee: Water Pik, Inc., Fort Collins, CO (US)

( * ) Notice: Subject to any disclaimer, the term of this patent is extended or adjusted under 35 U.S.C. 154(b) by 161 days.

(21) Appl. No.: 18/424,115

(22) Filed: Jan. 26, 2024

(65) Prior Publication Data

US 2024/0252294 A1    Aug. 1, 2024

Related U.S. Application Data

(60) Provisional application No. 63/538,261, filed on Sep. 13, 2023, provisional application No. 63/441,628, filed on Jan. 27, 2023.

(51) Int. Cl.
*A61C 17/02* (2006.01)

(52) U.S. Cl.
CPC ................................ *A61C 17/0202* (2013.01)

(58) Field of Classification Search
CPC . A61C 17/002; A61C 17/0202; A61C 17/024; A61C 17/028
See application file for complete search history.

(56) References Cited

U.S. PATENT DOCUMENTS

| | | | | |
|---|---|---|---|---|
| 2,915,265 | A * | 12/1959 | Tiger | ..................... G11B 15/26 |
| | | | | 248/575 |
| 4,063,060 | A | 12/1977 | Litch, III | |
| 5,399,089 | A * | 3/1995 | Eichman | ................ A61C 17/02 |
| | | | | 601/165 |
| 5,530,304 | A | 6/1996 | Mirumachi et al. | |
| 6,174,142 | B1 | 1/2001 | Holt | |
| 6,592,285 | B1 * | 7/2003 | Schwarz | ................. F16F 15/08 |
| | | | | 403/53 |
| 6,912,866 | B2 * | 7/2005 | Seo | ..................... F04B 39/0044 |
| | | | | 181/207 |
| 7,182,506 | B2 | 2/2007 | Schulz et al. | |

(Continued)

FOREIGN PATENT DOCUMENTS

| | | |
|---|---|---|
| CN | 110871461 | 3/2010 |
| CN | 107453526 | 12/2017 |

(Continued)

*Primary Examiner* — Ralph A Lewis

(57) ABSTRACT

In one embodiment, an oral irrigator is disclosed. The oral irrigator may include a housing, a drive assembly positioned within the housing, a pump assembly coupled to the drive assembly and an isolator assembly coupled to at least one of the drive assembly or the pump assembly and configured to dampen vibrations generated by either or both of the drive assembly or the pump assembly. The isolator assembly includes a chassis operably coupled to a portion of at least one of the drive assembly or the pump assembly, an engagement arm coupled to and extending outwards from the chassis, and a dampener positioned between the chassis and a portion of the housing, the dampener comprising a pocket defined therein and configured to support the isolator assembly within the housing, where the engagement arm engages an engagement surface of the dampener separate from a pocket surface defining the pocket.

17 Claims, 16 Drawing Sheets

FIG. 14B

(56)                    References Cited

U.S. PATENT DOCUMENTS

| | | | |
|---|---|---|---|
| 7,465,156 B2 * | 12/2008 | Lee | F04B 39/0044 |
| | | | 417/363 |
| 8,535,019 B2 | 9/2013 | Gummersbach et al. | |
| 8,813,867 B2 | 8/2014 | Peterson et al. | |
| 8,876,092 B2 * | 11/2014 | Wojcieson | F16F 15/08 |
| | | | 267/141 |
| 8,888,727 B2 * | 11/2014 | Boyd | A61C 19/02 |
| | | | 601/165 |
| 9,488,611 B2 | 11/2016 | Rezvani et al. | |
| 2013/0295520 A1 * | 11/2013 | Hsieh | A61C 17/02 |
| | | | 433/89 |
| 2014/0272782 A1 * | 9/2014 | Luettgen | A61H 13/005 |
| | | | 433/80 |
| 2015/0021840 A1 * | 1/2015 | Murayama | F16F 3/12 |
| | | | 267/140.4 |
| 2017/0067347 A1 | 3/2017 | Kareff et al. | |
| 2022/0257355 A1 | 8/2022 | Pham et al. | |

FOREIGN PATENT DOCUMENTS

| | | | |
|---|---|---|---|
| CN | 206792507 U | 12/2017 | |
| CN | 206860428 | 1/2018 | |
| CN | 207041588 U | 2/2018 | |
| CN | 209212493 U | 8/2019 | |
| CN | 209629882 U | 11/2019 | |
| CN | 111643205 | 9/2020 | |
| CN | 211405725 U | 9/2020 | |
| CN | 112350501 | 2/2021 | |
| CN | 212788764 U | 3/2021 | |
| CN | 212853701 U | 4/2021 | |
| CN | 212853702 U | 4/2021 | |
| CN | 213722568 U | 7/2021 | |
| CN | 217908044 | 11/2022 | |
| EP | 1015787 | 2/2006 | |
| EP | 1662166 | 5/2006 | |
| EP | 2331819 | 6/2011 | |
| EP | 2030587 | 7/2014 | |
| EP | 3733116 | 11/2014 | |
| EP | 2156054 | 12/2015 | |
| EP | 2182218 | 4/2016 | |
| EP | 2744442 | 5/2019 | |
| EP | 3479795 | 5/2019 | |
| EP | 3621553 | 3/2020 | |
| EP | 3661453 | 6/2020 | |
| EP | 3076245 | 3/2021 | |
| GB | 2201842 | 9/1988 | |
| JP | H0724927 | 6/1995 | |
| JP | 2011206121 | 10/2011 | |
| JP | 6410109 | 10/2018 | |
| KR | 101530568 | 6/2015 | |
| TW | M418133 | 12/2011 | |
| WO | 2019120083 | 6/2019 | |

* cited by examiner

VIBRATION ISOLATOR FOR ORAL IRRIGATORS

CROSS-REFERENCE TO RELATED APPLICATIONS

This application claims priority to U.S. Provisional Patent Application No. 63/441,628 filed on 27 Jan. 2023 titled "Vibration Isolator for Oral Irrigators," and to U.S. Provisional Patent Application No. 63/538,261 filed on 13 Sep. 2023 titled "Oral Irrigator," all of which are hereby incorporated by reference herein in their entireties for all purposes.

TECHNICAL FIELD

The present disclosure relates generally to oral health devices, such as oral irrigators.

BACKGROUND

Many people use oral irrigators and other electronic oral health devices, such as tooth brushes, to maintain and improve oral health. Many oral irrigators include an electrically driven pump that pumps fluid from a reservoir or other fluid supply to a handle. The pump assembly and drive assembly for operating the pump typically include a motor, a pump and/or gear housing, and various linkages. During operation, the pump assembly components can generate vibrations and noise due to the moving parts, e.g., the motor can generate vibrations when the drive shaft rotates. The vibrations often may be passed through to the housing and other external components of the oral irrigator, generating noise (e.g., rattling of the parts), and cause an unpleasant user experience, as well as generate wear due to movement on the moving parts. As such, there is a need for improved vibration isolators for pump assembles and/or drive assemblies for oral irrigators and other oral health devices.

SUMMARY

In one embodiment, an oral irrigator is disclosed. The oral irrigator may include a housing, a drive assembly positioned within the housing, a pump assembly coupled to the drive assembly and an isolator assembly coupled to at least one of the drive assembly or the pump assembly and configured to dampen vibrations generated by either or both of the drive assembly or the pump assembly. The isolator assembly includes a chassis operably coupled to a portion of at least one of the drive assembly or the pump assembly, an engagement arm coupled to and extending outwards from the chassis, and a dampener positioned between the chassis and a portion of the housing, the dampener comprising a pocket defined therein and configured to support the isolator assembly within the housing, where the engagement arm engages an engagement surface of the dampener separate from a pocket surface defining the pocket.

Optionally, in some embodiments, the engagement surface forms an exterior surface of the dampener.

Optionally, in some embodiments, the exterior surface is a top surface of the dampener and is positioned above the pocket surface.

Optionally, in some embodiments, the engagement arm is coupled to the dampener at a location other than the pocket.

Optionally, in some embodiments, the engagement arm includes a first engagement arm and a second engagement arm, wherein the first engagement arm contacts the engagement surface of the dampener and the second engagement arm is positioned adjacent to the pocket surface of the dampener.

Optionally, in some embodiments, the second engagement arm is positioned within the pocket and the engagement surface is positioned above the pocket such that the first engagement arm is positioned above the pocket.

Optionally, in some embodiments, the pocket surface includes a first pocket surface, a second pocket surface, and a third pocket surface, wherein the second engagement arm contacts the first pocket surface and the third pocket surface and does not contact the second pocket surface.

Optionally, in some embodiments, the engagement surface is positioned above the pocket and the first pocket surface forms an interior surface of the pocket, and the third pocket surface forms a bottom interior surface of the pocket; and the second engagement arm is at least partially received within the pocket.

Optionally, in some embodiments, the housing includes a mounting surface and the dampener includes a mounting head received through an aperture within the mounting surface and the dampener supports the chassis above the mounting surface.

Optionally, in some embodiments, the chassis does not contact the mounting surface.

Optionally, in some embodiments, the mounting surface defines a bottom surface of the housing.

Optionally, in some embodiments, the chassis is operably coupled to at least one of: a drive shaft of the drive assembly; one or more gears of the drive assembly; a connecting arm of the pump assembly; or a piston of the pump assembly.

Optionally, in some embodiments, the chassis further defines a gear box for receiving gearing for the drive assembly.

Optionally, in some embodiments, the oral irrigator includes a stop coupled to at least one of the dampener or the engagement arm and configured to limit motion of the engagement arm relative to the dampener in at least one direction.

Optionally, in some embodiments, the pocket is a first pocket and the dampener includes a second pocket, wherein the engagement surface is formed in the second pocket and the engagement arm is at least partially received within the second pocket.

In one example, an oral irrigator is disclosed. The oral irrigator includes a housing, a vibration generating component positioned within the housing, and an isolator assembly coupled to the vibration generating component. The isolator assembly includes a chassis coupled to the vibration generating component, an engagement arm coupled to the chassis, and a dampener positioned between the chassis and the housing, where the engagement arm engages a top surface of the dampener and a bottom surface of the dampener engages the housing.

Optionally, in some embodiments, the vibration generating component includes a portion of a drive assembly or a pump assembly for the oral irrigator.

Optionally, in some embodiments, the engagement arm includes a first engagement arm and a second engagement arm, wherein the first engagement arm engages the top surface of the dampener and the second engagement arm engages another surface of the dampener that is not the top surface.

Optionally, in some embodiments, the dampener further includes a pocket defined through a sidewall thereof.

Optionally, in some embodiments, the engagement arm includes a first engagement arm and the isolator assembly includes a second engagement arm, wherein the second engagement arm is received at least partially within the pocket.

Optionally, in some embodiments, a thickness of the second engagement arm is less than a height of the pocket.

Optionally, in some embodiments, at least one of the dampener or the engagement arm includes a stop to limit movement of the engagement arm relative to the dampener in at least one direction.

In one example, an oral irrigator is disclosed. The oral irrigator includes a substrate, a chassis, a vibration generating component supported by the chassis, and a dampener separating the chassis from the substrate to reduce transfer of vibrations from the vibration generating component to the substrate. The dampener including a body and first and second slots defined on a side of the body. A portion of the chassis is received in the first slot and the second slot is positioned between the first slot and the substrate to reduce transfer of vibrations of the substrate.

Optionally, in some embodiments, the first slot and the second slot form a continuous space in the side of the body of the dampener such that the portion of the chassis occupies the first slot and the second slot is positioned directly beneath the portion of the chassis.

Optionally, in some embodiments, the second slot is separated from the first slot by a portion of the body of the dampener.

Optionally, in some embodiments, the chassis includes an engagement arm, and wherein the portion of the chassis includes a portion of the engagement arm.

Optionally, in some embodiments, the second slot is separated from the engagement arm by a portion of the body of the dampener.

Optionally, in some embodiments, the engagement arm includes a first engagement arm, wherein the chassis further includes a second engagement arm, and wherein a portion of the body of the dampener is positioned between the first engagement arm and the second engagement arm.

Optionally, in some embodiments, the first engagement arm is positioned above the portion of the body of the dampener, and wherein the second engagement arm is positioned in the first slot below the portion of the body of the dampener.

One of skill in the art will understand that each of the various aspects and features of the disclosure may advantageously be used separately in some instances, or in combination with other aspects and features of the disclosure in other instances. Accordingly, individual aspects can be claimed separately or in combination with other aspects and features. Thus, the present disclosure is merely exemplary in nature and is in no way intended to limit the claims or their applications or uses. It is to be understood that structural and/or logical changes may be made without departing from the spirit and scope of the present disclosure.

The present disclosure is set forth in various levels of detail and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. Moreover, for the purposes of clarity, detailed descriptions of certain features will not be discussed when they would be apparent to those with skill in the art so as not to obscure the description of the present disclosure. The claimed subject matter is not necessarily limited to the arrangements illustrated herein, with the scope of the present disclosure is defined only by the appended claims.

BRIEF DESCRIPTION OF THE DRAWINGS

The description will be more fully understood with reference to the following figures in which components may not be drawn to scale, which are presented as various embodiments of the oral irrigator and/or vibration isolator described herein and should not be construed as a complete depiction of the scope of the claimed features.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
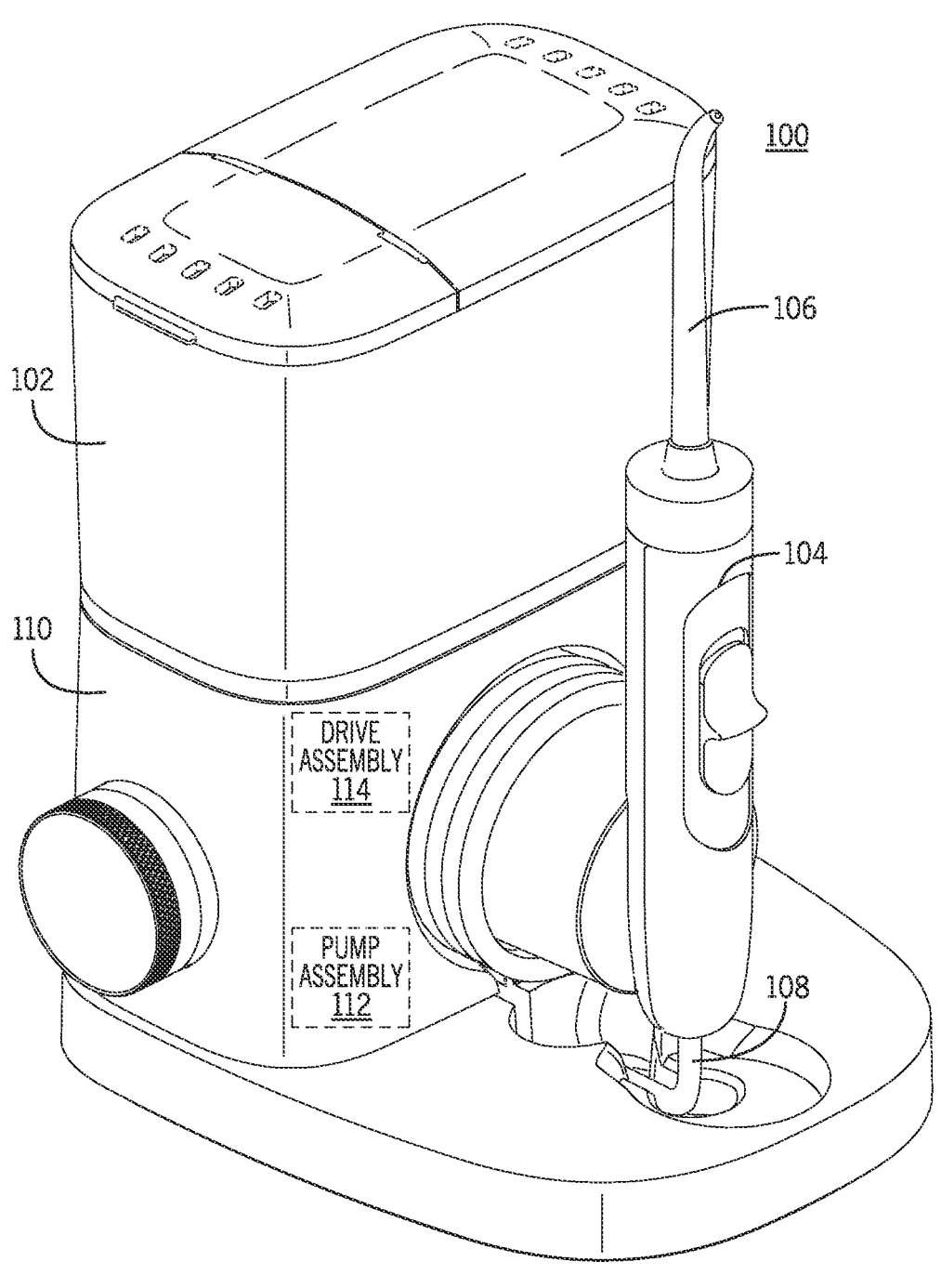
FIG. 1 is an isometric view of an oral irrigator including an isolator assembly.

Embodiments of the present disclosure relate to components of an oral irrigator that may include improved configurations for vibration isolators or dampeners that may be used in conjunction with one or more pump assemblies, pump housings, and/or drive assemblies, all of which may be used together (as shown in various figures) or may be used separately from one another depending on the type of oral irrigator (e.g., countertop versus handheld), spacing/sizing, and the like. As such, the discussion of any particular element, feature, component, assembly, or the like, should be understood as being a standalone element, or may be integrated into a system. Relatedly, although the discussion presented herein is related to oral irrigators, the concepts and embodiments may be applicable to other types of oral health devices, such as, but not limited to, brushing devices, combination irrigating brushing devices, or other elements that may pump fluid from one location, such as a reservoir, to another.

In some embodiments, an isolator assembly for use in dampening vibrations and/or reducing noise (e.g., generated by a drive assembly and/or pump assembly) for oral health devices, such as oral irrigators, is disclosed. The isolator assembly may include a chassis couples to and/or receives one or more vibration inducing components, such as components of the drive assembly or pump assembly. The chassis may include a plate or surface to couple to various components and/or may include sidewalls and/or define an enclosure depending on the desired structure of the drive assembly or pump assembly. The chassis may include one or more engagement arms that couple to a dampener, where the dampener couples the chassis to a mounting surface, such as a surface or different surfaces of the housing of the oral irrigator. The dampener separates the chassis from the mounting surface, e.g., defines a gap between the two components, such that the chassis contacts the mounting surface through the dampener.

In many embodiments, the isolator assembly may include two engagement arms, where a first engagement arm contacts on a first surface (e.g., a top surface or engagement surface) of the dampener and a second engagement arm abuts or contacts a second and/or a third surface of the dampener (e.g., a pocket surface). For example, the dampener may include a slot or pocket, where the second arm is partially received within the pocket and the first engagement arm sits on a top surface above the pocket. In this manner, the engagement arms transfer the load of the chassis to the dampener. In some embodiments, the pocket reduces the cross-sectional thickness of certain portions of the dampener, such as those between the first engagement arm and the housing, the reduced thickness may help to increase the vibration dampening by introducing increased flexibility into the joint connection, as well as including a longer transmission path from the first engagement arm to the housing.

The engagement arms may be formed in various configurations and may extend directly from the chassis or otherwise be coupled thereto. Similarly, the engagement arms may be positioned, angled, and/or structured based on space constraints within the oral irrigator housing, drive or pump assembly requirements, or the like.

It should be noted that the engagement arms and dampener may be considered an isolation mount and there may be any number of isolation mounts for the device, depending on the load, space constraints, etc. In one embodiment, there may be three isolation mounts, but in other examples, there may be two, four, or even more. However, in embodiments with three isolation mounts, the overall connection to the mounting surface may be more flexible, reducing vibration transmission, but also sufficiently rigid to secure the isolation assembly in position within the housing.

FIG. 1 illustrates an oral irrigator including one or more of the isolator assemblies described herein. The oral irrigator 100 may include a reservoir 102 that holds a fluid, such as water or mouthwash, to provide the fluid to a pump. In instances where the oral irrigator 100 is a countertop unit, the reservoir 102 may be coupled to a housing 110 or base and where the oral irrigator 100 is a handheld unit the reservoir 102 may be coupled to a handle 104 or hand piece for the oral irrigator 100. Relatedly, the size and volume capacity of the reservoir 102 may be based on the type and configuration of the oral irrigator 100. The reservoir 102 may include a reservoir outlet, such as a port or plug, valve, or the like, that is fluidly coupled to other components of the oral irrigator 100 (e.g., a pump assembly).

With continued reference to FIG. 1, oral irrigator 100 may include a housing 110 or base portion, which in the embodiment illustrated in FIG. 1 acts to support the oral irrigator 100 on a surface (e.g., countertop) and optionally may support the reservoir 102. In some instances, the housing 110 may be configured as a countertop support, but in other iterations may be formed as a handle portion or a portion held in the hand of a user during use. The housing 110 supports and/or encloses one or more components of the oral irrigator 100, such as a pump assembly 112 and/or drive assembly 114. Additionally, the housing 110 may include fluid pathways (e.g., tubes, hoses) that direct fluid between different components of the oral irrigator, such as between the reservoir 102 and the pump assembly 112 and/or drive assembly 114 and an outlet, such as a handle.

A handle 104 may be fluidly coupled to the reservoir 102, such as via a hose 108 or other fluid connector. The handle 104 may include a tip 106 or other outlet device that can direct fluid from the reservoir 102 into a user's oral cavity. The handle 104 may be configured to be held in a user's hand and in embodiments where the oral irrigator 100 is configured as a handheld device, may include features of the housing 110, e.g., the pump assembly 112 and/or drive assembly 114 may be coupled to or positioned within the handle 104. The handle 104 may also include features to secure the tip 106 thereto and optionally allow release of the tip 106 therefrom. The tip 106 may be in the form of a jet tip or other tip configuration, e.g., may include bristles (e.g., nozzle integrated with a brush head), tongue scraper, or the like.

The pump assembly 112 may include various pump components that assist in pumping and directing fluid from the reservoir 102 into the handle 104 and tip 106. For example, the pump assembly 112 may include a pump body, a piston, a connecting rod, and one or more valves. An example of a pump assembly may be found in U.S. Pat. No. 8,888,727 titled Vibration Damping for Dental Water Jet, incorporated herein for all purposes. Similarly, the drive assembly 114 may be operably coupled to the pump assembly 112 and may be configured to include one or more drive elements (e.g., motor, linkages, gears, gear supports, etc.). The drive assembly 114 assists in driving or actuating the pump assembly 112 or components thereof and will be discussed in detail below. Examples of the drive assembly may also be found in the '727 patent mentioned above.

Figure 2A:
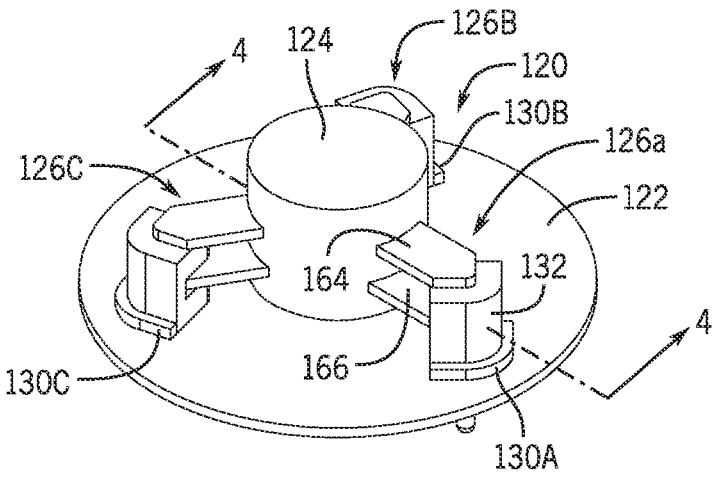
FIG. 2A is a top isometric view of the isolator assembly.
Figure 2B:
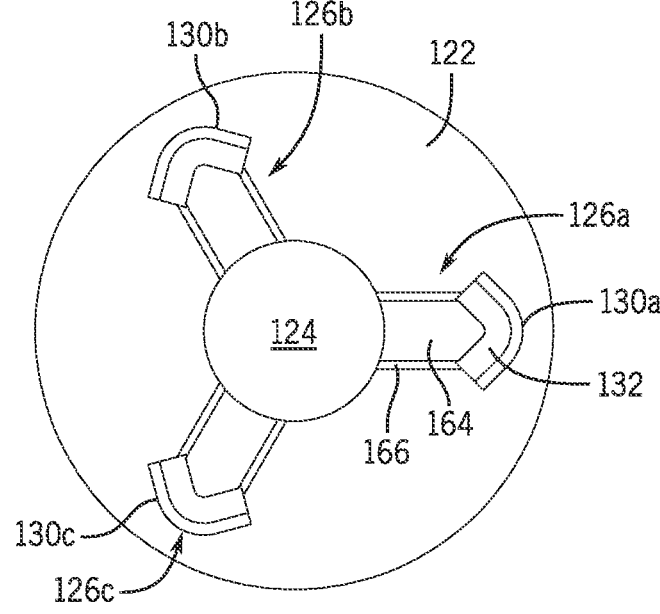
FIG. 2B is a top plan view of the isolator assembly.
Figure 3:
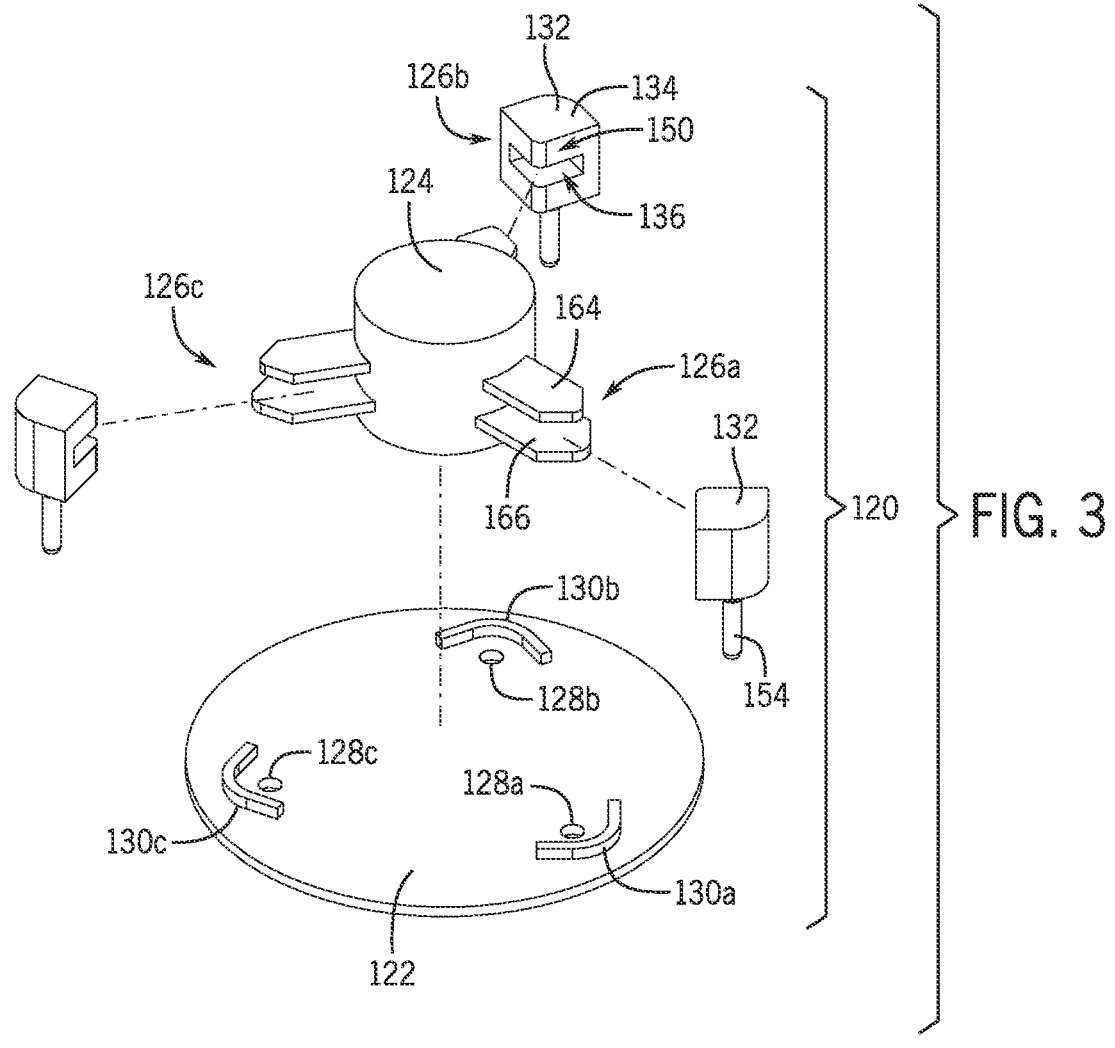
FIG. 3 is an exploded view of the isolator assembly.

FIGS. 2A-3 illustrate various views of an isolator assembly 120 that may be used with the oral irrigator 100 of FIG. 1. The isolator assembly 120 may be used to support and/or house one or more components of the pump assembly 112 and/or drive assembly 114 and act to reduce or dampen the vibrations and noise generated by one or both assemblies 112, 114. For example, the isolator assembly 120 may be positioned within the housing 110 and couple portions of the drive and pump assemblies 112, 114 to the housing 110, e.g., may be positioned between or in a manner otherwise configured to absorb forces generated by the assemblies 112, 114 to reduce the forces transmitted to the housing.

The oral irrigator 100 may include one or more isolator assemblies 120 depending on the space constraints and/or vibration inducing components utilized within the oral irrigator 100. For example, if the pump assembly 112 and drive assembly 114 are large or need to be distributed in different areas within the housing 110, the oral irrigator 100 may include two or more separate isolator assemblies 120, e.g., one for the pump assembly 112 and one for the drive assembly 114.

A chassis 124 may form a part of the isolator assembly 120 and may be configured to support, house, enclose, or otherwise couple to components of or the entirety of the pump assembly 112 and/or drive assembly 114. In one example, the chassis 124 may include an internal cavity or cavities and form a gear box to house gears of the drive assembly 114, may include a pump body portion to house a piston of the pump, and/or may receive portions of the connecting components, such as a connecting rod or the like. In another example, the chassis 124 may be formed or define in part a planar surface, such as a plate, that may support the pump assembly 112 and/or drive assembly 114 thereon, e.g., the drive assembly 114 may be mounted to the top surface of the chassis 124. Relatedly, while the chassis 124 is shown as a single element, it may be formed as a multi element component, e.g., may include a bottom portion and a top portion that could together define a receiving cavity therein to receive the various components. The chassis 124 is meant to encompass almost any type of housing element that may support or define portions of a pump assembly 112 and/or drive assembly 114.

A mounting surface 122 or substrate may support the chassis 124 and be coupled to the chassis 124 via one or more isolation mounts 126a, 126b, 126c. The mounting surface 122 may form a portion of the housing 110 of the oral irrigator 100, e.g., a bottom surface or an interior surface of the housing 110. It should be noted that while the mounting surface 122 is shown as a single component, in various embodiments, the mounting surface 122 may be separate and/or disconnected surfaces within or forming a portion of the housing 110. In other words, the isolation mounts 126a, 126b, 126c may be coupled to different surfaces or portions of the housing 110.

With reference to FIG. 3, one or more brackets 130a, 130b, 130c or ribs may be defined on atop or first side of the mounting surface 122. The brackets 130a, 130b, 130c may act as a stop to limit motion of the isolation mounts 126a, 126b, 126c relative to the mounting surface 122. For example, the brackets 130a, 130b, 130c may be configured to engage or abut against a portion of the isolation mounts 126a, 126b, 126c. In one example, the brackets 130a, 130b, 130c may be formed to include a middle curved portion that includes two adjacent legs extending therefrom, e.g., as a flattened U shaped structure. The brackets 130a, 130b, 130c may be formed integrally with the mounting surface 122 or may be coupled thereto. The brackets 130a, 130b, 130c may be configured to help reduce rotation of the isolation mounts 126a, 126b, 126c and secure the isolation assembly 120 in position relative to the housing 110.

With continued reference to FIG. 3, one or more receiving apertures 128a, 128b, 128c may be formed in the mounting surface 122. The receiving apertures 128a, 128b, 128c may be positioned so as to be partially surrounded by the brackets 130a, 130b, 130c. For example, the receiving apertures 128a, 128b, 128c may be defined to be adjacent to the curved portion of the brackets 130a, 130b, 130c (in embodiments where the brackets 130a, 130b, 130c are shaped as shown in FIG. 3).

The isolation assembly 120 may include one more isolation mounts 126a, 126b, 126c that may be coupled to the chassis 124 and act to support the isolation housing 124 within the housing 110, as well as dampen or otherwise reduce vibrations or noise generated by components within the chassis 124 or by components coupled to the isolation housing 124.

The isolation mounts 126a, 126b, 126c may include a dampener 132. The dampener 132 may be configured to absorb forces and vibrations. For example, the dampener 132 may be formed or include a flexible material, such as an elastomer or rubber material.

Figure 4:
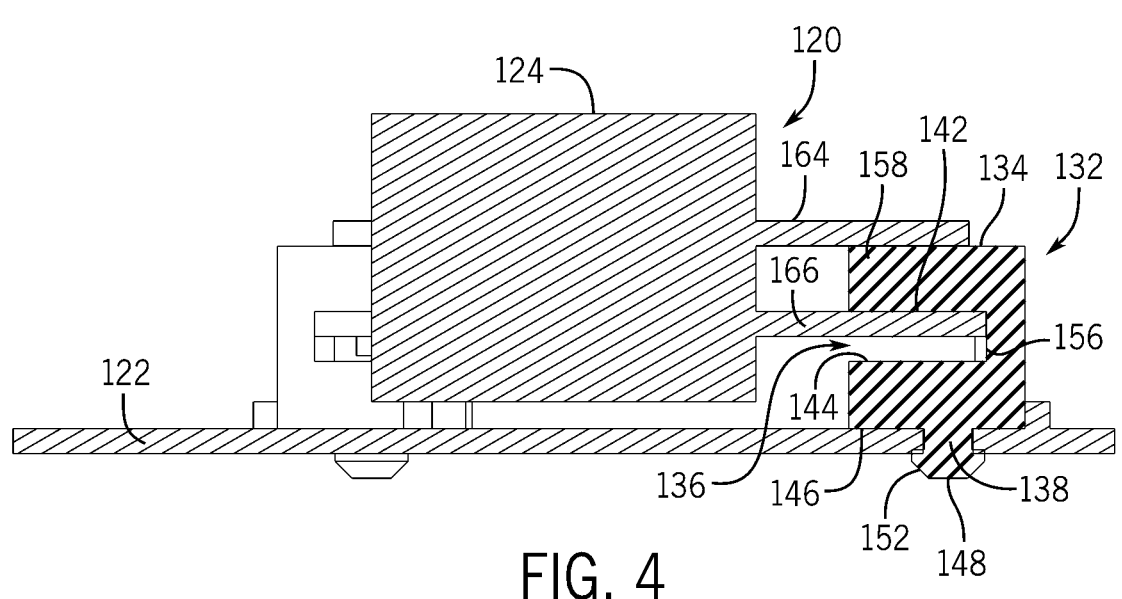
FIG. 4 is a cross-section view of the isolator assembly taken along line 4-4 in FIG. 2A.

FIG. 4 shows a cross section view of the isolation assembly taken along line 4-4 in FIG. 2B. With reference to FIGS. 3 and 4, the dampener 132 may include a pocket 136 or slot for receiving a portion of the isolation mounts 126a, 126b, 126c. The dampener 132 may include a top surface 134 or engagement surface and a bottom surface 146 that may be coupled together via one or more sidewalls 150. The sidewalls 150 may include straight portions and/or curved portions. In many embodiments, the sidewalls 150 may include rounded edges to help distribute forces when the dampener 132 engages with different components and/or to ensure a snug fit against adjacent components, such as brackets 130a, 130b, 130c. For example, in some embodiments, the dampener 132 may be formed generally as a triangular shape with a rounded base and curved transition surfaces. However, as can be appreciated, the dampener 132 may take on a variety of different shapes depending on the configurations of the housing 110, the pump assembly 112, and/or drive assembly 114, as such the discussion of any particular implementation is meant as illustrative only.

A mount head 148 may extend from the bottom surface 146 and may include a neck portion 138 and an enlarged tip 152. The shape of the mount head 148 may be selected to help enable connection of the dampener 132 to the mounting surface 122 as will be discussed in more detail below. With reference to FIG. 3, in some embodiments, the mount head 148 may also include a tail 154 that extends from the tip 152. The tail 154 may be used to assist in installation of the mount head 148 and may be removed afterwards or may be omitted depending on the assembly of the isolator assembly 120.

A pocket 136 may be defined through a portion of the dampener 132, such as defining a recess or slot extending into a body of the dampener 132. For example, the pocket 136 may be defined as a slot. The pocket 136 may be formed in one or more sidewalls of the dampener 132, such that the pocket 136 opening may be accessed via the sides and/or front surface of the dampener 132. With reference to FIG. 4, the pocket 136 may be defined by a pocket top surface 142 and a pocket bottom surface 144 or first and second pocket surfaces. The pocket 136 may also include a sidewall or back wall 156 or a third pocket surface. The pocket top surface 142 may be parallel to and adjacent the top surface 134, such that a dampener flange 158 or dampener portion may be defined between the two surfaces 134, 142.

With reference again to FIG. 3, one or more engagement arms 164, 166 may extend from or be coupled to the chassis 124 or otherwise form a portion of the chassis 124. In examples where the chassis 124 includes a planar surface or plate, the engagement arms 164, 166 may extend outwards from the portion of the surface or the chassis 124 may include raised portions (e.g. tabs) that may form supports for the engagement arms 164, 166. In other examples, the engagement arms 164, 166 may extend from a sidewall, top wall, and/or bottom wall of the chassis 124 (e.g. when the chassis 124 defines an enclosed or partially enclosed housing). The isolator mounts 126a, 126b, 126c may include a pair of engagement arms 164, 166 configured to be coupled to the dampener 132. The engagement arms 164, 166 may include at least one parallel portion, or as shown in FIG. 3, may be parallel to one another along their length, with a first engagement arm 164 being positioned above a second engagement arm 166. In other words, the two engagement arms 164, 166 may be separated by a gap from one another and extend outwards from the outer surface of the chassis 124. In one example (see FIG. 4), the first engagement arm 164 may have a shorter length than the second engagement arm 166. The extended length of the second engagement arm 166 may allow the second engagement arm 166 to engage the back wall 156 of the pocket 136, which helps to prevent additional movement between the engagement arm 166 and/or dampener 132, such as sliding of the engagement arm 166 during force application (the engagement against the back wall acts to limit motion). In other embodiments, the second engagement arm 166 may have a shorter length (e.g. may not abut against the back wall of the pocket) to introduce movement which may increase flexibility.

As can be appreciated, the length and configuration of the engagement arms 164, 166 may be varied based on space constraints within the housing 110 of the oral irrigator 100, the configuration of the chassis 124, and so on. FIGS. 6A-9 illustrate various examples of the engagement arms 164, 166 that may be used with the isolator assembly 120. The engagement arms 164, 166 may act to support and connect the chassis 124 (and any components supported or coupled thereto) to the dampener 132.

With reference again to FIG. 3, the chassis 124 may have various numbers of engagement arms 164, 166 or pairs, but in one example, may include three pairs of engagement arms 164, 166 may be spaced around the outer surface of the chassis 124, where the spacing may be configured to assist in retaining the coupling between the engagement arms 164, 166 and the dampeners 132 (e.g., equally spaced to help counter balance forces in different directions and distribute the load).

Figure 5A:
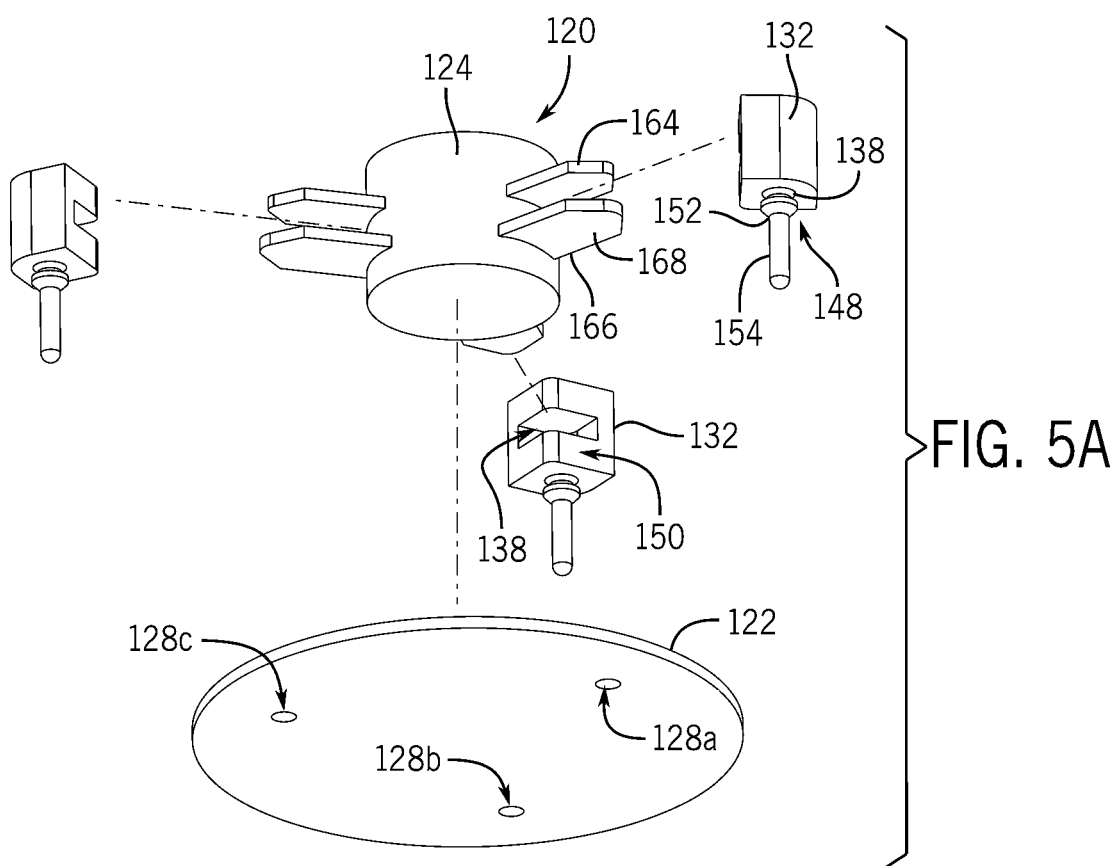
FIG. 5A is a bottom exploded view of the isolator assembly.
Figure 5B:
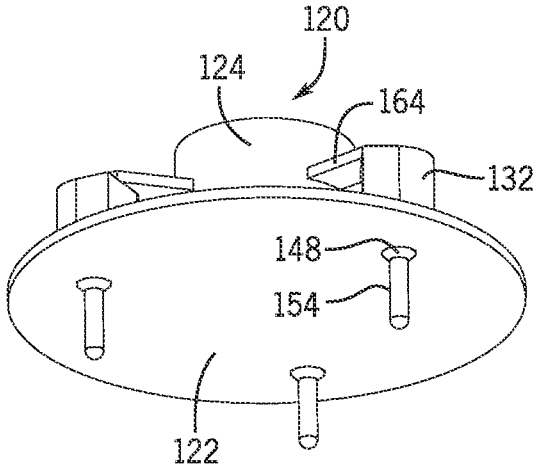
FIG. 5B is a bottom isometric view of the isolator assembly with a tail coupled to a dampener.
Figure 5C:
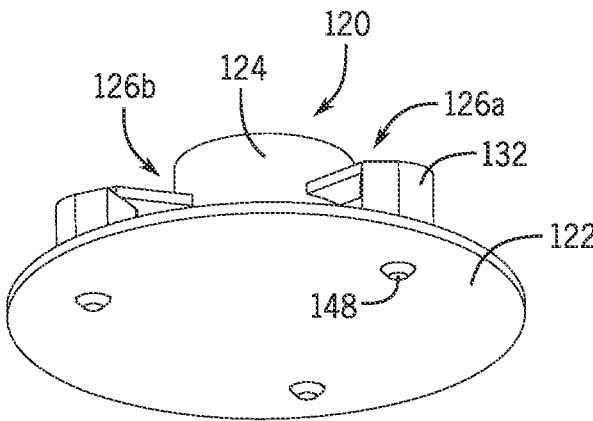
FIG. 5C is a bottom isometric view of the isolator assembly with the tail removed.

FIGS. 5A-5C illustrate various views of the isolator assembly 120 during coupling of the various components. With reference to FIG. 5A, one or more components of the pump assembly 112 and/or drive assembly 114 may be positioned within the chassis 124. For example, one or more gears, a connecting arm, a piston, or other components may be positioned within or partially within the chassis 124. It should be noted that the various components may be coupled to the chassis 124 after the chassis 124 is coupled to the mounting surface 122 or before it is coupled to the mounting surface 122.

The dampeners 132 may be coupled to the engagement arms 164, 166. For example, with reference briefly to FIG. 4, the first dampener flange 158 may be positioned between the two engagement arms 164, 166, such that the first engagement arm 164 may be positioned and engage the top surface 134 or engagement surface of the dampener 132 and the second engagement arm 166 may be inserted or at least partially received within the pocket 136. In some configurations, the first dampener flange 158 may be grasped or clamped between the two engagement arms. The positioning of the first engagement arm 164 on the top surface 134 of the dampener 132 helps to prevent the flange 158 from flexing away from the engagement arm 164 when a load is exerted on the chassis 124 and the weight of the chassis 124 may be transferred to the dampener 132 via the top surface 134 engagement.

The second engagement arm 166 may be positioned such that a top surface of the second engagement arm 166 abuts against the top surface 142 of the pocket 136. In many configurations, there may be a space between the bottom surface of the second engagement arm 166 and the bottom surface 144 of the pocket 136, e.g. a thickness of the second engagement arm 166 may be less than a height of the pocket 136), such that the second engagement arm 166 does not contact the bottom surface 144 of the pocket 136 In some embodiments, a single engagement arm may be used to connect to the dampener 132 and in these instances, the first engagement arm 164 may engage the top surface 134 and the second arm may be omitted. In these embodiments, the coupling between the dampener 132 and the engagement arm 164 may be less rigid as compared to the dual arm embodiments, which may reduce the vibrations transmitted between the two components. In some instances, one or more stops either positioned on the engagement arm and/or the dampener may be used to help secure the two components together. Once the first isolation mount 126a is assembled the others may be assembled in a similar manner, e.g., by coupling the dampeners 132 to the various pairs of engagement arms 164, 166.

The isolation mounts 126a, 126b, 126c may be coupled to the mounting surface 122. For example, the dampeners 132 may be coupled to the mounting surface 122, such as by positioning the tail 154 into the respective receiving apertures 128a, 128b, 128c on the mounting surface 122. The tail 154 may then be pulled to elongate the mount head 148, allowing the mount head 148 to deform and be received through the receiving apertures 128a, 128b, 128c. With reference to FIG. 5B, after the mount head 148 passes through the receiving apertures 128a, 128b, 128c, the force on the tail 154 may be removed, and the resilient mount head 148 will return to its original shape. The original shape of the mount head 148 has a diameter larger than the receiving apertures 128a, 128b, 128c, securing the dampener 132 to the mounting surface 122. For example the neck portion 138 may extend through the mounting surface 122 and the mount head 148 may be positioned on an exterior or bottom side of the mounting surface 122. The mount head 148 may then prevent the dampener 132 from being inadvertently removed from the mounting surface 122.

With reference to FIG. 5C, in some embodiments, the tail 154 portion of the dampener 132 may be removed after installation. For example, the tail 154 may be clipped or otherwise removed from the mount head 148, which may help position the isolator assembly 120 within the housing 110 and help to prevent removal of the mount head 148 after installation.

With reference to FIGS. 2A and 4, when connected to the mounting surface 122, the dampener 132 of the isolation mounts 126a, 126b, 126c may be positioned to abut against the brackets 130a, 130b, 130c. In this manner, the isolation assembly 120 is secured on position relative to the mounting surface 122, with the dampeners 132 securing the isolation assembly 120 and limiting vertical movement of the chassis 124 relative to the mounting surface 122. Similarly, the brackets 130a, 130b, 130c assisting in reducing or preventing lateral motion of the isolation assembly 120 relative to the mounting surface 122. Once assembled or as part of the assembly process, the mounting surface 122 may be positioned within or secured to the housing 110 of the oral irrigator 100 and the drive or pump components positioned within or coupled to the chassis 124 may be coupled to the other components. In one example, the mounting surface 122 may form a portion of a bottom surface of the oral irrigator 100 housing 110 such that other components may also be coupled thereto. In other examples, the mounting surface 122 may be a separate floor or surface coupled within the housing.

With reference to FIG. 4, during operation of the oral irrigator 100 (e.g., activation of the pump assembly 112 and/or drive assembly 114), the isolator assembly 120 may reduce vibrations and/or noise (e.g., attenuate energy) that may be generated during operation. For example, as a motor begins to drive a piston forming a portion of the pump assembly 112, the vibration generated by the movement of the piston, drive shaft, and/or gears, may be transmitted from the chassis 124 to the engagement arms 164, 166. Due to the coupling of the engagement arms 164, 166 to the dampener 132, the engagement arms 164, 166 may transfer the force to the dampener 132. The first engagement arm 164 may engage against the top surface of the 134 of the dampener 132. The second engagement arm 166 may engage the surfaces within the pocket on upward forces or other forces generated that are in an opposite direction as the forces transferred by the first engagement arm 164. The dampener 132 may deflect and deform in both vertical and horizontal directions, absorbing the forces generated by the drive assembly 114 and/or pump assembly 112. For example, the variation in the cross-sectional thickness (such as along its height or in a direction of load) and/or gaps in the body of the dampener (e.g. pocket or gap between the second engagement arm 166 and the bottom surface of the pocket 136) help to reduce rigidity in the joint, reducing force transmission to the mounting surface.

In conventional dampening arrangements for oral irrigators, often the sole dampening function was to connect noisy parts to a compressive material, such as a rubber, and the joints or connections between the pump or motor housing would be rigid or substantially rigid. In this manner, a larger amount of vibrations may be transferred from the drive assembly or pump assembly to the housing, creating a noisy and otherwise undesirable user experience. As such, the more flexible connections of the isolator assembly 120 improve energy dampening, allowing fewer vibrations to be transmitted to the housing 110, offering a more pleasing user experience and reducing wear and tear on parts that can be generated due vibrations.

As mentioned above, various components of the isolator assembly can be modified based on the configurations within the oral irrigator as well as desired dampening functionality. For example, FIGS. 6A-11 illustrate various views of different configurations of the isolator assembly 120. It should be noted that the various components shown in FIGS. 6A-11 may be used together or may be used individually. For example, certain features of the engagement arms, engagement features, and/or dampener may be combined with other examples discussed herein, and the discussion with respect to any complete configuration is meant as illustrative only. Relatedly, to the extent any element in FIGS. 6A-11 is not explicitly discussed it can be assumed to the same as or similar to the elements described above with respect to FIGS. 2-5.

Figure 6A:
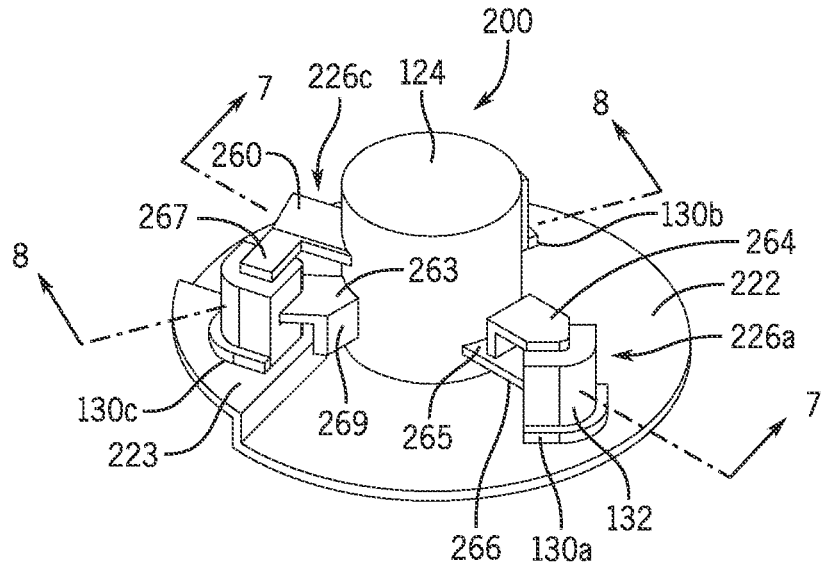
FIG. 6A is atop isometric view of another embodiment of an isolator assembly.
Figure 6B:
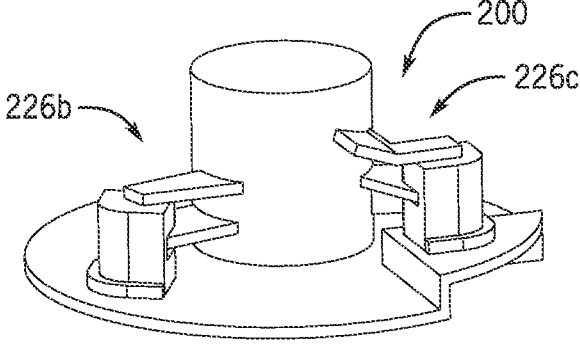
FIG. 6B is a side elevation view of the isolator assembly of FIG. 6A.
Figure 6C:
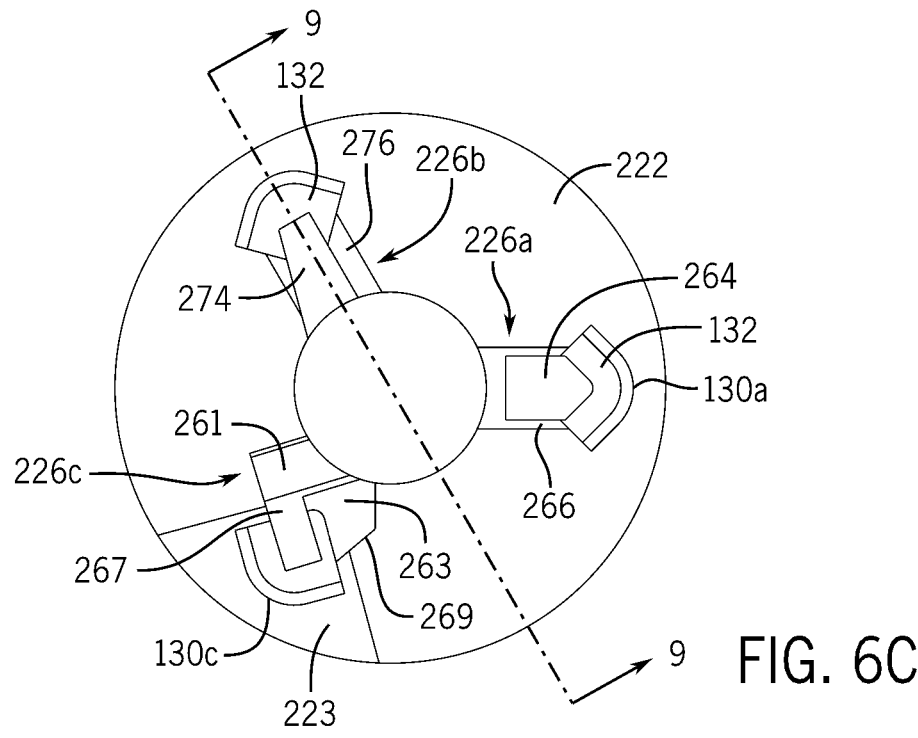
FIG. 6C is a top plan view of the isolator assembly of FIG. 6A.
Figure 7:
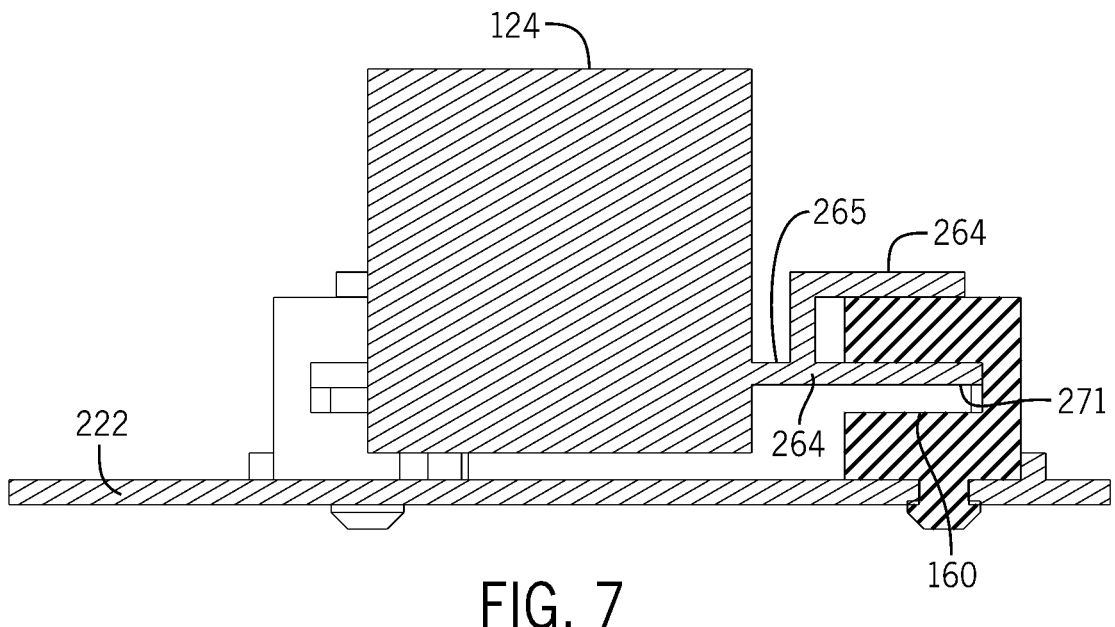
FIG. 7 is a cross-section view of the isolator assembly of FIG. 6A taken along line 7-7 in FIG. 6A.

Turning to FIGS. 6A-6C, an isolator assembly 200 is disclosed that may be substantially similar to the isolator assembly 120, but may include varied configurations of the engagement arms and/or mounting surface. More specifically, the mounting surface 222 may be configured to include a non-planar surface and include a shelf 223 or raised feature that may be formed or coupled to the mounting surface 222. For example, the shelf 223 may be formed as a raised element that may provide additional clearance for that area of the mounting surface 222 relative the housing 110 or support surface for the oral irrigator 100. In this example, one of the isolator mounts 226a, 226b, 226c may be coupled to the shelf 223 portion of the mounting surface 222, such that the dampener 132 may be raised relative to other dampeners 132. It should be noted that the mounting surface 222 may include multiple raised, depressed, or otherwise differently configured surface areas and the description of any particular surface configuration is meant as illustrative.

In some embodiments, the engagement arms may be varied and include different anchoring locations to the chassis and/or engagement features for the dampener. For example, with reference to FIGS. 6A and 7, the first isolator mount 226a includes engagement arms 264, 266 that may be coupled to the chassis 124 at the same location. For example, an anchoring branch 265 may extend from a sidewall of the chassis 124, where the first engagement arm 264 may include an extension portion coupled to the anchoring branch 265 and extend upwards from the anchoring branch 265. The anchoring branch 265 may then continue and extend into and form the second engagement arm 266. In this manner, the two engagement arms 264, 266 may be arranged to be in parallel to one another and spaced apart (e.g., above or below) one another, but may include a single anchoring location relative to the chassis 124. It should be noted that while the configuration shown in FIGS. 6A and 7 includes the anchoring branch 265 being formed on the second engagement arm 266, in other configurations, the anchoring branch 265 may be formed on the first engagement arm 264 and the second engagement arm 266 may extend downwards therefrom.

Figure 8:
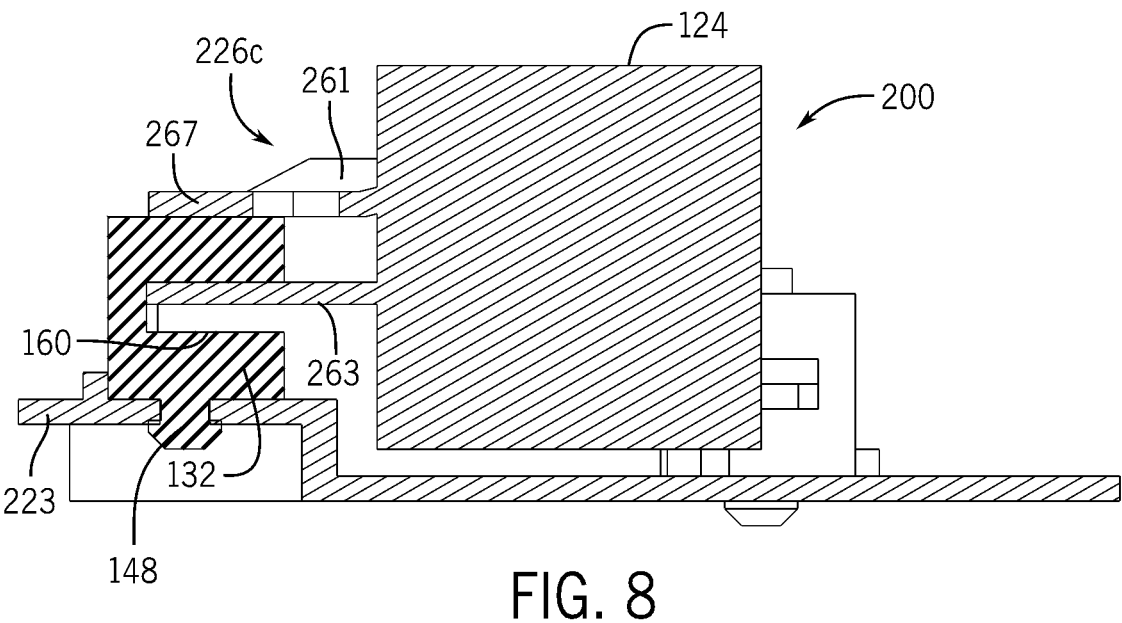
FIG. 8 is a cross-section view of the isolator assembly of FIG. 6A taken along line 8-8 in FIG. 6A.

With reference to FIGS. 6A, 6B, and 8, in some examples, the engagement arms may include an anchoring branch 261 that couples the engagement arms to the chassis 124, but where the engagement arms 263, 267 may extend at different directions, e.g., are angled, relative to the anchoring branching 261. For example, the engagement arm 267 may extend at a right angle relative to the anchoring branch 261, allowing the dampener 132 and chassis 124 to be positioned or otherwise fit into an available space within the housing 110 more readily. In this example, the second engagement arm 263 may also include a base portion 269 that may be configured to wrap around the shelf 223 of the mounting surface 222. However, in other configurations, the base portion 269 may be omitted.

Figure 9:
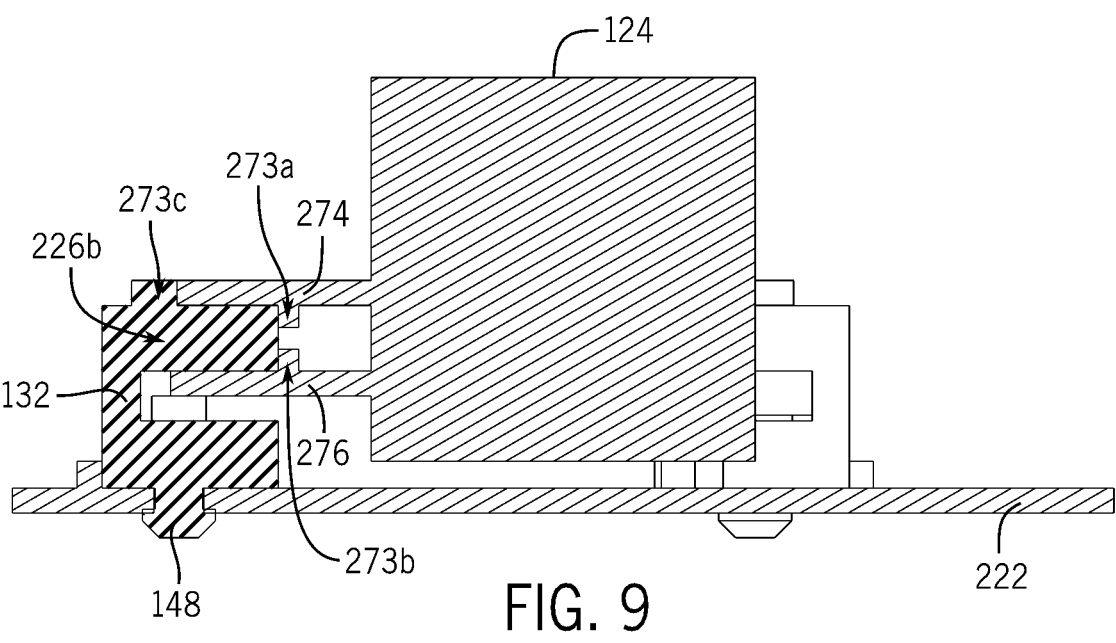
FIG. 9 is a cross-section view of the isolator assembly of FIG. 9 taken along line 9-9 in FIG. 6C.

With reference to FIG. 9, in the isolator mount 226b, the engagement arms 274, 276 and/or dampener 132 may include one or more stops 273a, 273b, 273c that may extend from a top or bottom surface thereof and be configured to limit movement of the engagement arms 274, 276 relative to the dampener 132 in at least one direction. For example, the stops 273a, 273b, 273b may limit horizontal or lateral movement. In some embodiments, the stops 273a, 273b, 273c may be used to eliminate the need for two engagement arms while still including sufficient coupling to the engagement arm and dampener.

Figure 10:
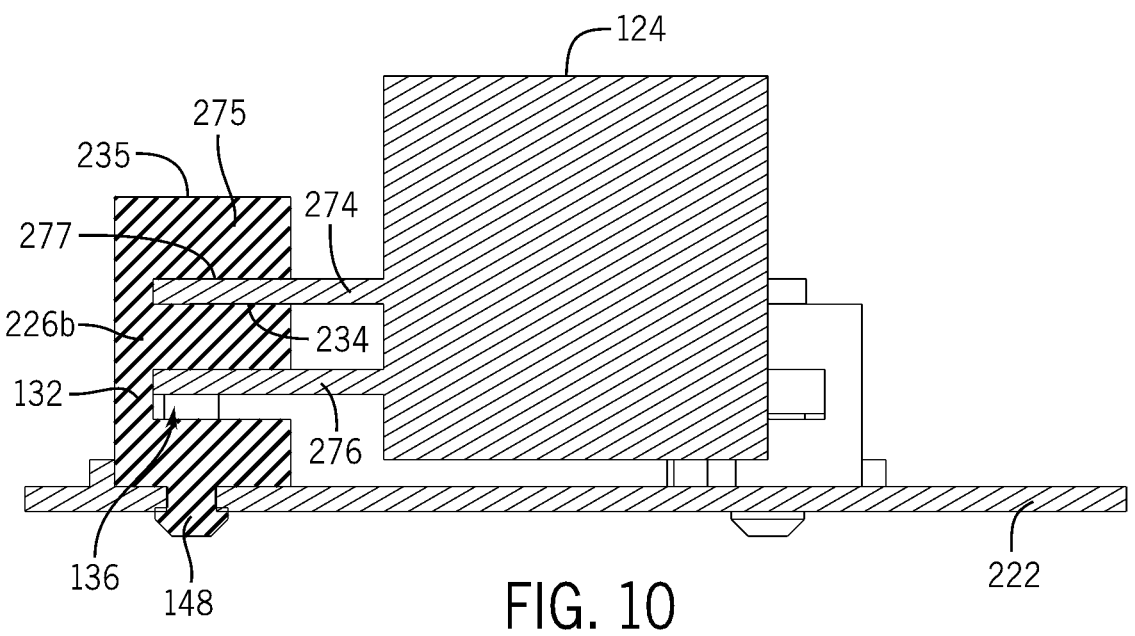
FIG. 10 is a cross-section view of an example of an isolator assembly taken along a similar line as 9-9.

With reference to FIG. 10, another example of a dampener 132 is disclosed. In this example, the dampener 132 may include a second pocket or gap 277 and the engagement surface 234 between the first engagement arm 274 and the dampener 132 may not be on the top surface 235 of the dampener 132. In this example, a top flange 275 may be defined and the dampener 132 may include two pockets 136, 277, which may be in the form of slots. In some examples, the two pockets 136, 277 may have similar dimensions, or as shown in FIG. 10, the pocket 136 may have a deeper or longer length than the top pocket 277. In various examples, however, the pockets 136, 277 act to reduce the thickness of the dampener 132 at different locations to reduce vibration transmission. In this example, the second engagement arm 276 may be omitted and the top pocket 277 may also act to grasp or clamp the first engagement arm 274 and hold it in position relative to the dampener 132.

Figure 11:
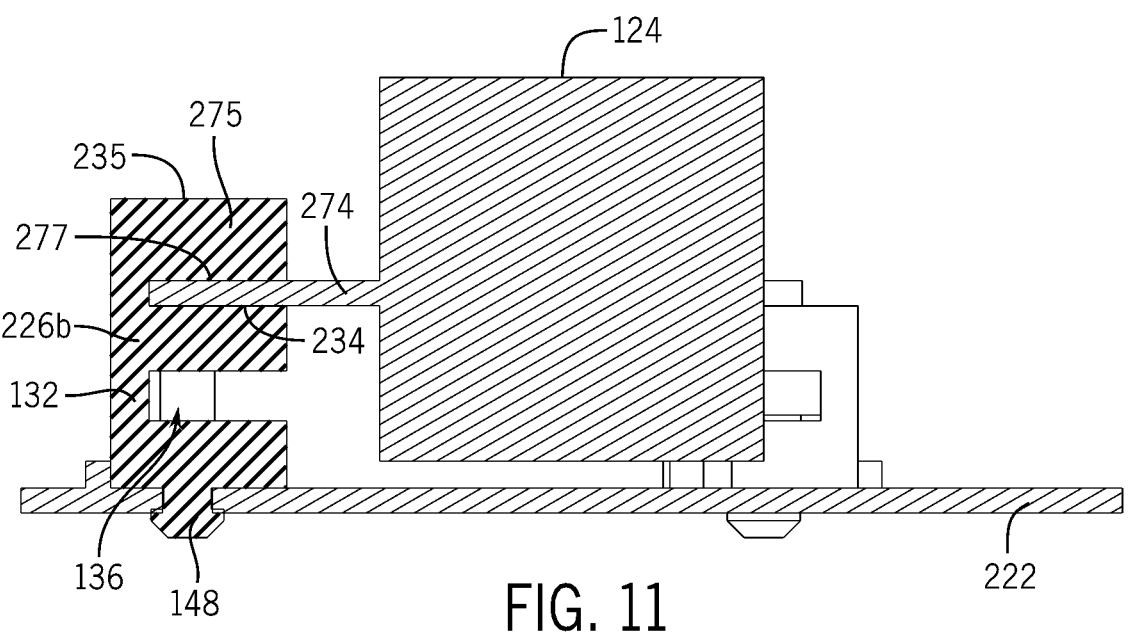
FIG. 11 is a cross-section view of an example of an isolator assembly taken along a similar line as 9-9.
Figure 12:
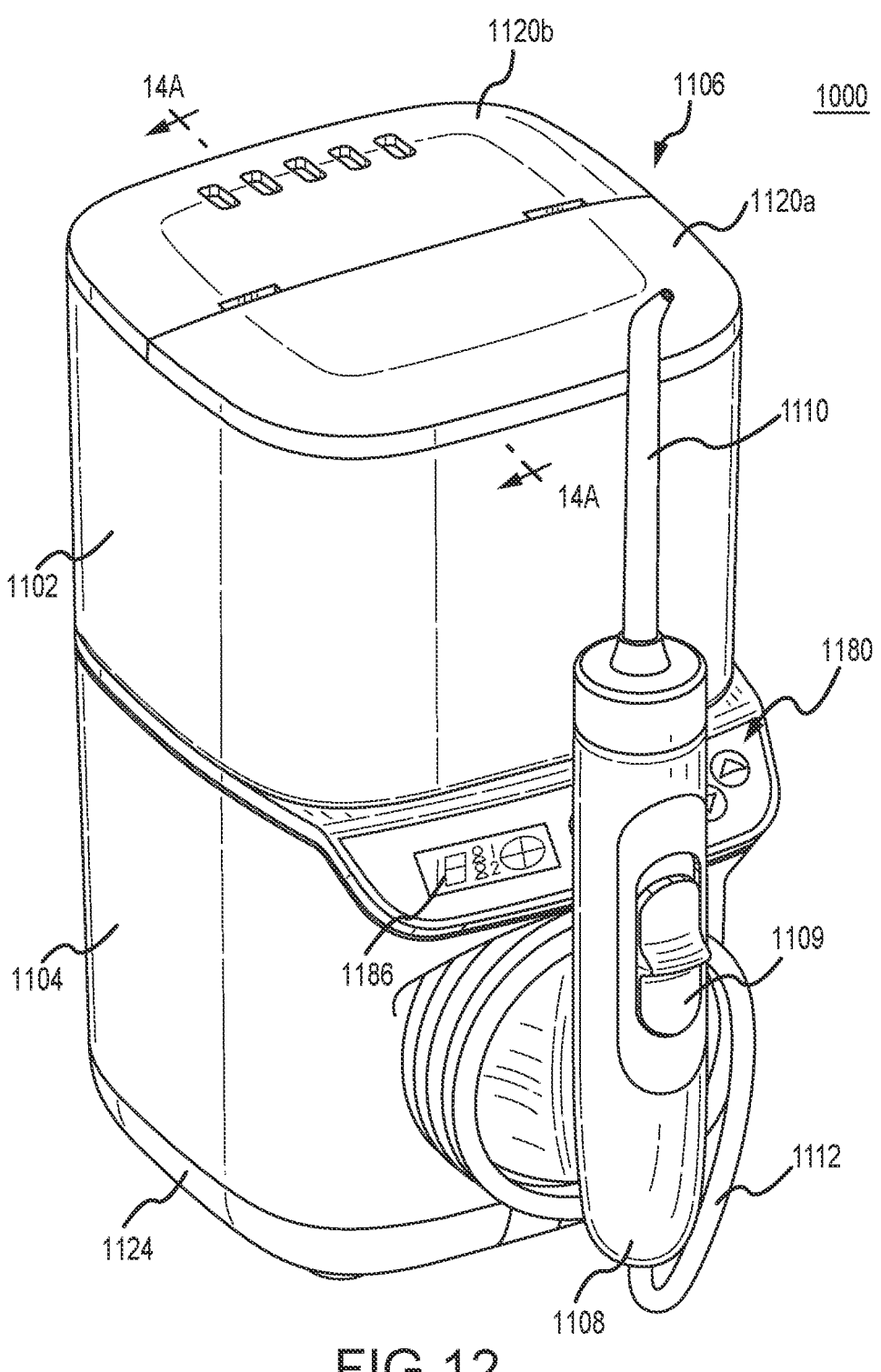
FIG. 12 is a perspective view of an embodiment of an oral irrigator including an isolator assembly.

For example, with reference to FIG. 11, the second engagement arm 276 is omitted and the top pocket 277 clamps around the first engagement arm 274 to secure it in position. In the embodiment shown in FIG. 11, the dampener 132 may be more flexible as the contact points between the chassis 124 and the dampener 132 may be reduced and the varied (e.g. reduced thickness) due to the pockets 277, 136 reduce the rigidity of the dampener 132 along its height. This helps to reduce the transmission of force (e.g. vibrations) by the dampener 132.

As can be understood, any of the features for the isolator assembly 200 can be incorporated into the features of the isolator assembly 120 and vice versa. For example, the engagement arms 164, 166 of the isolator assembly 120 may be configured to have a flat planar bottom surface (e.g. omit the engagement feature 168). Similarly, the engagement arms 164, 166 may include a branch portion or be angled to connect to the dampener 132 as may be required based on the internal space configurations of the oral irrigator 100.

FIGS. 12-17 show an embodiment of an oral irrigator 1000 including an isolator assembly. The oral irrigator 1000 may include a reservoir 1102 that holds a fluid, such as water or mouthwash, to provide the fluid to a pump assembly 1123 (shown for example in FIG. 13, 14A, 14B, and partially in FIG. 15). In instances where the oral irrigator 1000 is a countertop unit, the reservoir 1102 may be coupled to a housing or base 1104. Where the oral irrigator 1000 is a handheld unit the reservoir 1102 may be coupled to a handle or hand piece for the oral irrigator 1000. The irrigator 1000 may include a lower housing 1124 that couples to the base 1104 and supports the irrigator 1000 on a surface, such as via one or more support feet 1130a, 1130b, 1130c, 1130d coupled to the lower housing 1124. The base 1104 may define a compartment 1105 for receiving various components. Relatedly, the size and volume capacity of the reservoir 1102 may be based on the type and configuration of the oral irrigator 1000. The reservoir 1102 may include a reservoir outlet, such as a port or plug, valve, or the like, that is fluidly coupled to other components of the oral irrigator 1000 (e.g., a pump assembly 1123).

The irrigator 1000 includes a lid assembly 1106 configured to be positioned on the reservoir 1102 and to cover the reservoir cavity, e.g., to prevent debris from falling into the reservoir cavity. The lid assembly 1106 may be removable or in some examples may be partially moveable to allow access to the reservoir cavity without requiring removal of the lid assembly 1106. In one example, the lid assembly 106 may include a first or fixed portion 1120a and a second or hinged portion 1120b. The hinged portion 1120b may be pivoted relative to the fixed portion 1120a to define an access opening for the reservoir cavity 1172, e.g., to allow a user to refill the reservoir 1102 without having to remove the entire lid assembly 1106.

The oral irrigator 1000 may include a control assembly 1180 that may include a display 1186 and include one or more actuators adapted to allow a user to control the irrigator 1000. The oral irrigator 1000 includes a handle assembly 1108 coupled to a tip 1110 and an actuator or pause button 1109. The handle 1108 fluidically connects to the pump assembly via a hose 1112 that supplies fluid from the reservoir 1102 to the tip 1110. The oral irrigator 1000 includes a drive assembly 1122 that mechanically drives a pump 1123.

Figure 13:
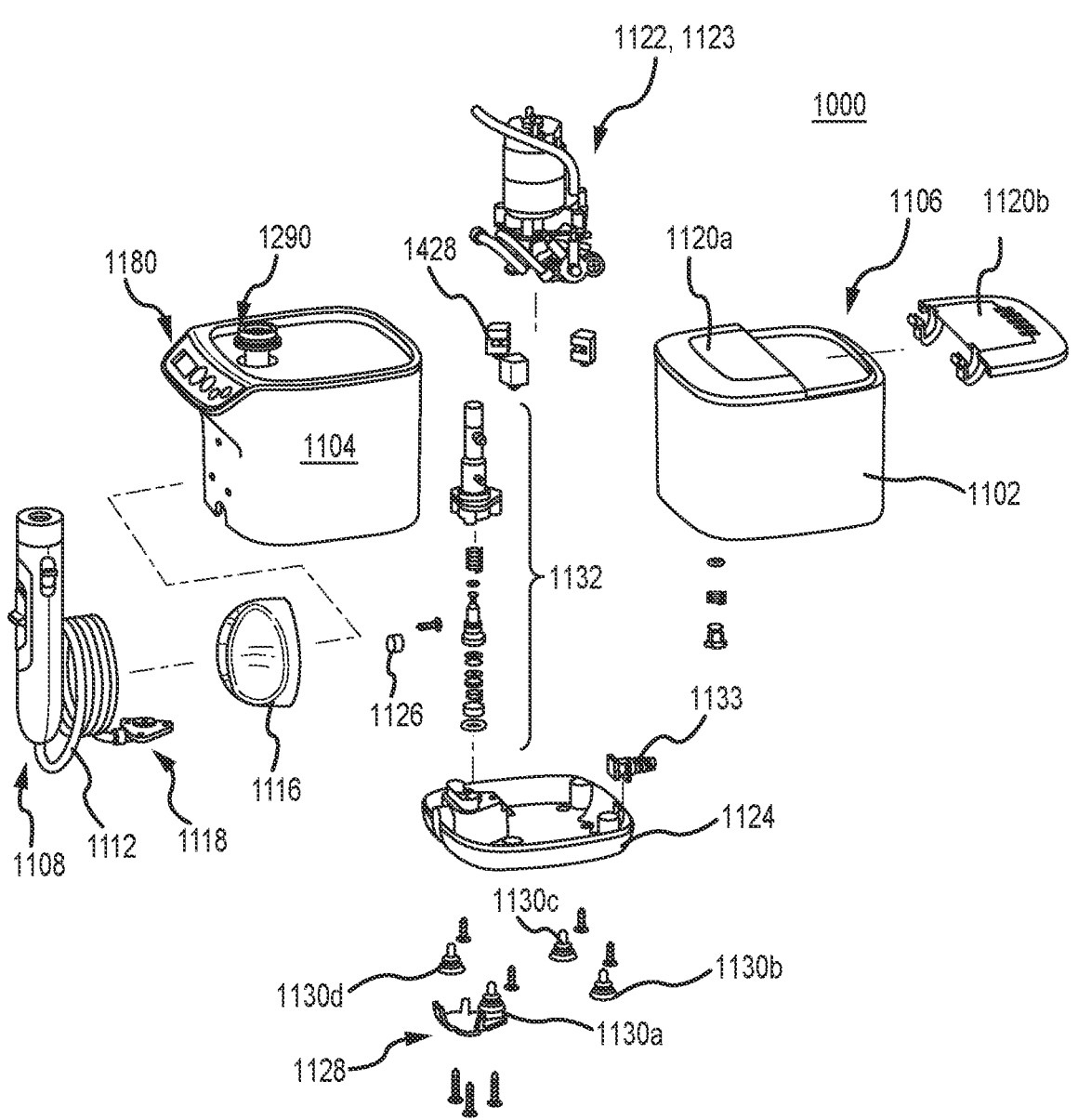
FIG. 13 is an exploded view of the oral irrigator of FIG. 12.

With reference to the exploded view of the oral irrigator 1000 shown for example in FIG. 13, the oral irrigator 1000 includes a hose fitting 1118 coupling the hose 1112 to the pump assembly 1122. The oral irrigator 1000 may include a mandrel 1116 coupled to the base 1104 about which the hose 1112 may be stored. A magnet 1126 may be positioned or captured within a pocket defined on an interior surface of the mandrel 1116. The hose 1112 can be wrapped around the outer surface of the mandrel 1116 and stored with the handle 1108 and secured in place via the magnet 126.

The oral irrigator 1000 includes a valve assembly 1132 that fluidly couples the reservoir 1102, pump assembly 1123 and handle 1108 together. The valve assembly 1132 may also be configured to enable bypass flow of fluid back to the reservoir 1102, such as when flow through an outlet (e.g., handle 1108) is obstructed, such as due to activation of a handle actuator or pause button 1109. The oral irrigator 1000 may include a reservoir valve assembly 1290 that may be connected to the top end of the valve assembly 1132 and mounted on the valve housing.

Figure 14A:
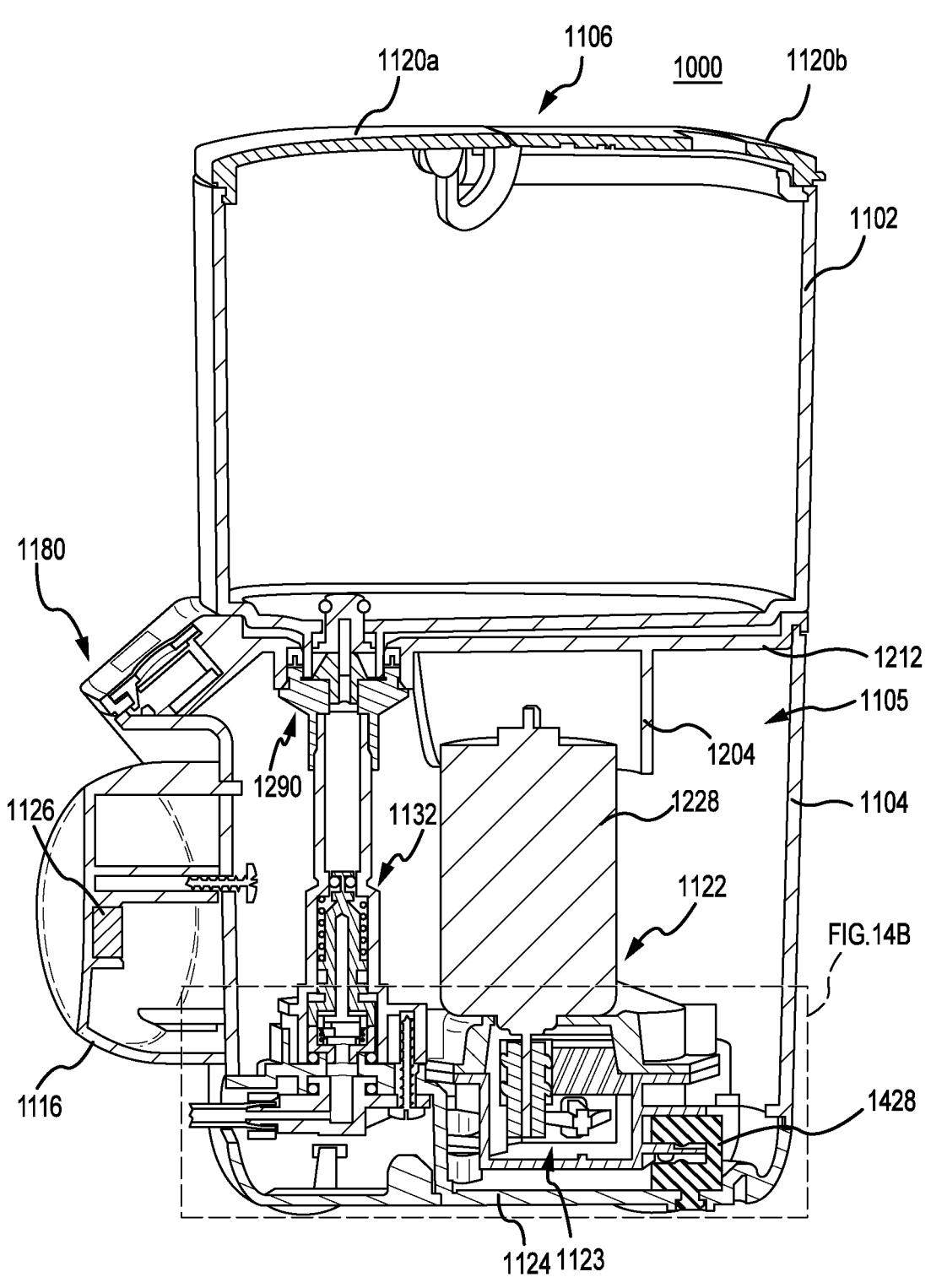
FIG. 14A is a cross-sectional view of the oral irrigator of FIG. 12 taken along line 14A-14A in FIG. 12.

With reference to FIG. 14A, a motor wall 1204 may extend downwards from a bottom surface 1212 of the housing 1124. The motor wall 1204 may define a substantially closed or fully closed shape, for example, as shown in FIG. 14A, the motor wall 1204 is defined as a cylindrical extension with an opening, e.g., discontinuous curved wall. In this manner, the motor wall 1204 may be able to more readily receive certain components, such as a motor, and secure them in position. However, in other embodiments, the motor wall 1204 will be fully continuous and configured to wrap around the respective drive assembly component, e.g., motor 1228. The motor wall 1204 may be especially helpful in instances where the motor 1228 may not be rigidly mounted to the housing, since the motor 1228 may be able to move more flexibly within the base 1104, the motor wall 1204 helps to ensure that the motor 1228 does not move too much and remains aligned, even after large force experiences (e.g., due to a drop force if the user drops the unit).

Figure 14B:
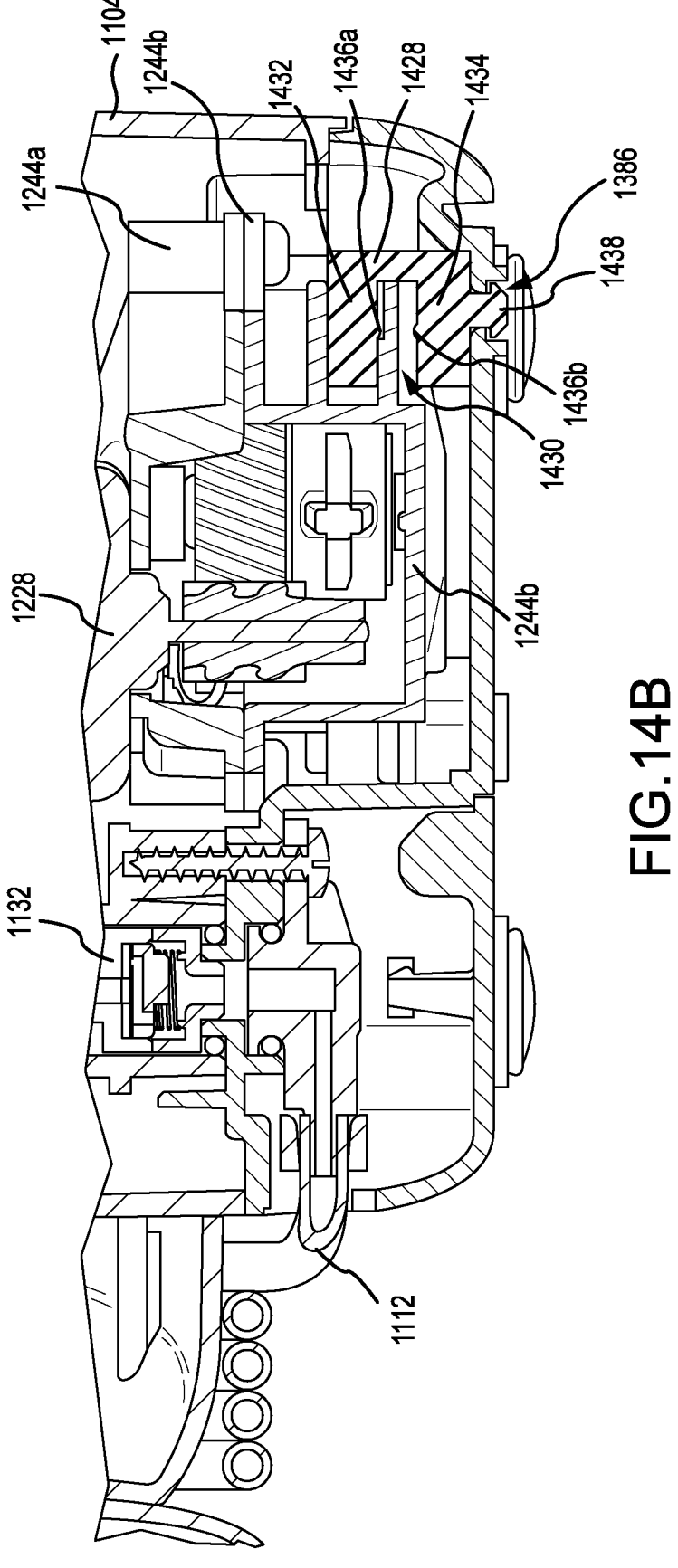
FIG. 14B is an enlarged view of the cross-sectional view of FIG. 14A.

With reference to FIG. 14B, one or more dampeners 1428 may be used to couple the pump housing 1244a, 1244b to the base 1104. The dampeners 1428 may be configured to absorb vibration to reduce forces from being transmitted to the base 1104. In one example, the dampeners 1428 are configured to couple to the mount supports 1280 and may include a main body having a slot 1430 formed in a sidewall thereof to define an engagement arm 1432 and a bottom arm 1434. The two arms 1432, 1434 may extend parallel to one another and be separated by a thickness of the slot 1430. A nub 1436a, 1436b may be formed on an interior surface of one or both of the engagement arm 1432 and the bottom arm 1434. In the example shown in FIGS. 14A and 14B, each of the interior surfaces of the engagement arm 1432 and the bottom arm 1434 may include a nub 1436a, 1436b adjacently arranged.

A mount head 1438 may extend from the bottom arm 1434 and may include a neck and a flange portion and may be configured to be deformed to fit through an aperture in the base 1104 and expand back to an original configuration to secure the dampeners 1428 to the base 1104. As can be understood, the dampeners 1428 may generally be formed of a flexible material, such as rubber.

In one example, the oral irrigator 1000 may include dampeners 1428 that may couple to different distributed areas of the pump housing 1244*a*, 1244*b*, but in other configurations different numbers of dampeners 1428 may be used. In examples, including three dampeners 1428, the assembly may be configured to be supported within the base 1104, but also enable movement of the pump housing 1244*a*, 1244*b* slightly due to including three anchor points (rather than four or more), introducing some instability, which may further help to prevent vibration transmission to the base 1104 as movement may require energy reducing the overall energy available for transmission to the base 1104.

Figures 15A, 15B:
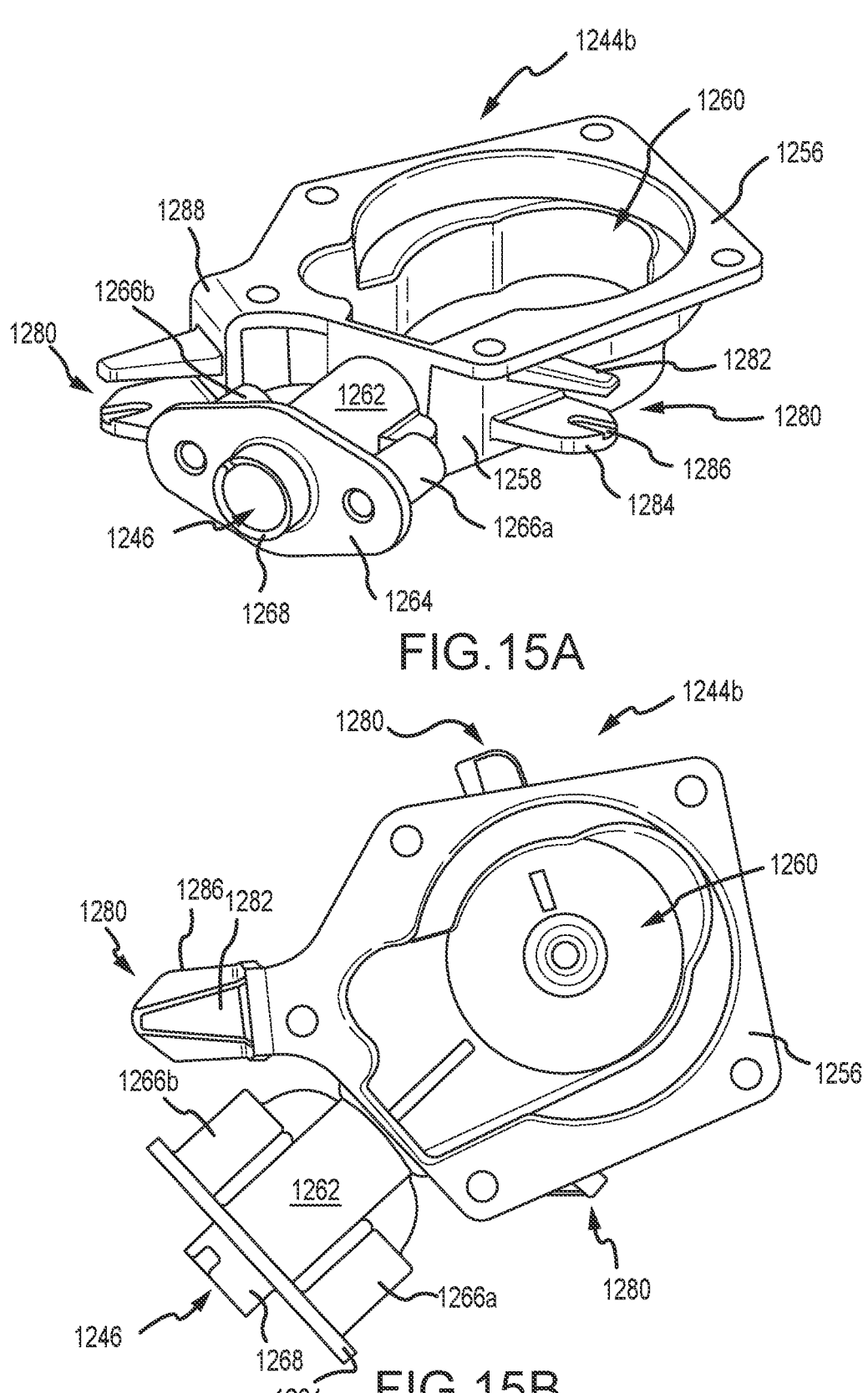
FIG. 15A is a top isometric view of a pump housing for the oral irrigator of FIG. 12.
FIG. 15B is atop plan view of the pump housing of FIG. 15A.

With reference to FIGS. 14B and 15A-B, the dampers 1428 may be coupled to the pump housing 1244, e.g., the lower pump housing 1244*b*. In one embodiment, the dampeners 1428 may be connected to the mount supports 1280, e.g., the engagement arm 1432 may be received between the first arm 1282 and the second arm 1284 of the mount supports 1280. In one embodiment, nub 1436*a* may be positioned within recess 1286 defined on the upper surface of the second arm 1284. In some embodiments, the thickness of the second arm 1284 of the pump mount 1280 may be configured such that it does not engage the bottom arm 1434 of the dampener 1428. In other words, there may be a space between the bottom surface of the second arm 1284 of the pump mount 1280 and the top surface of the bottom arm 1434 of the dampener 1428. This spacing may help to absorb energy by the dampener 1428, reducing transmission to the base 1104. In some examples, the coupling between the pump housing 1244, motor 1228, and dampeners 1428 may act to effectively cantilever the motor 1228 and a number of components of the drive and pump assemblies 1122, 1123, which may help to reduce vibration transmission during use as some motion is allowed by the assemblies.

Figure 16:
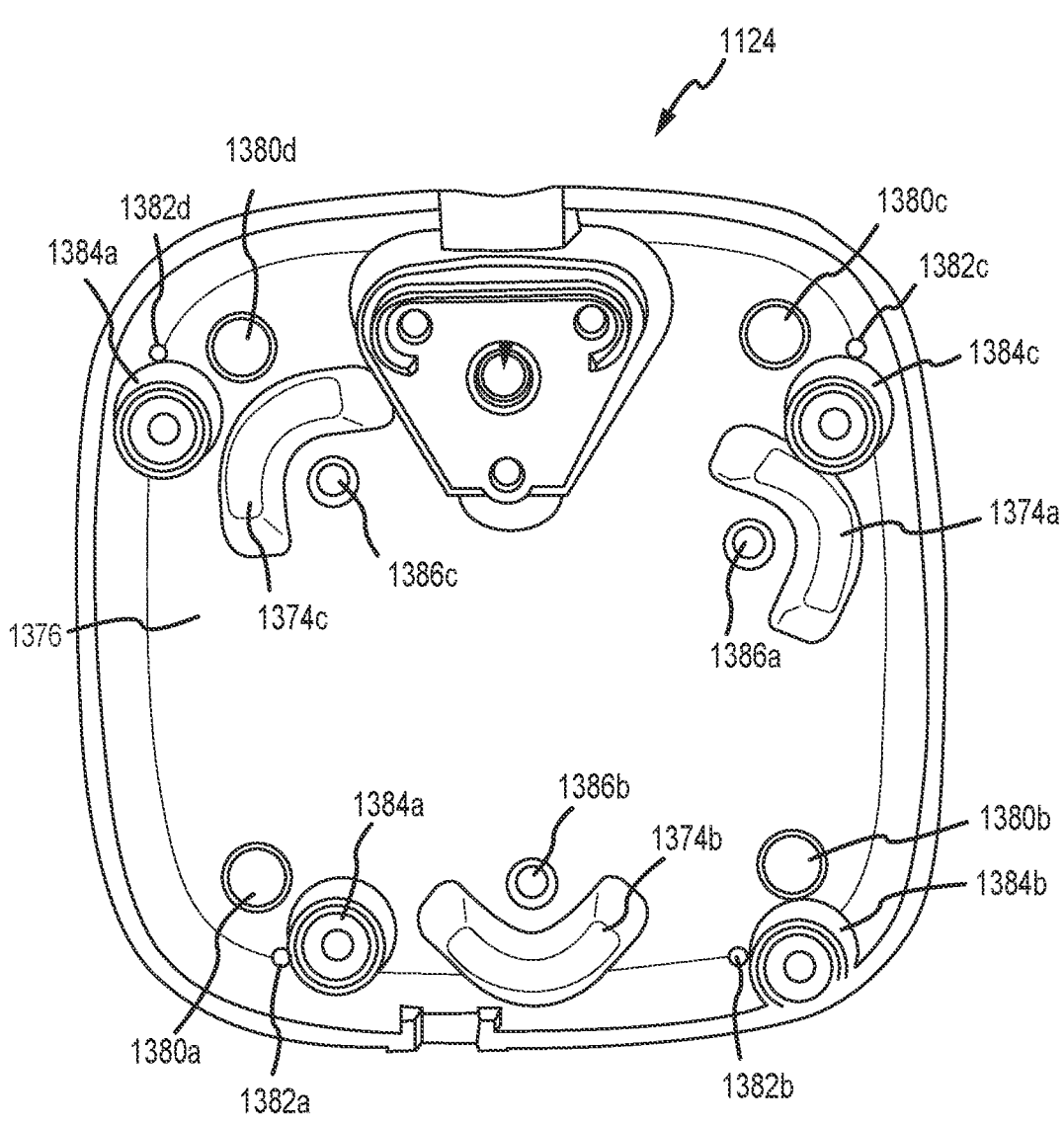
FIG. 16 is a top plan view of a lower housing base for the oral irrigator of FIG. 12.

With reference to FIGS. 14A, 14B, and 16, the pump and drive assemblies 1123, 1122 may be secured in position to the lower housing 1124 of the base 1104. For example, the mount heads 1438 of the dampeners 1428 may be inserted into the isolator apertures 1386*a*, 1386*b*, 1386*c* of the lower housing 1124. The mount heads 1438 may be deformed to be pushed through the apertures 1386*a*, 1386*b*, 1386*c* and then once on the exterior side of the lower housing 1124 may expand back out to secure the dampener 1428 in positon. The bumpers 1374*a*, 1374*b*, 1374*c* may be positioned around the exterior sidewalls of the dampeners 1428 to help provide lateral support for the dampeners 1428 within the lower housing 1124. In some embodiments, the dampeners 1374*a*, 1374*b*, 1374*c* extend around and follow the shape of the dampeners 1428, e.g., have a slight bend to change direction with the exterior sidewalls of the dampeners 1428, and have a height configured to be less than half of the height of the main body of the dampener 1428 (e.g., the portion of the dampener 1428 extending into the interior side of the lower housing 1124 and not including the height of the mount head 1438). Further, due to the angled slope of the dampener facing side of the bumpers 1374*a*, 1374*b*, 1374*c*, the sidewalls of the bumpers 1374*a*, 1374*b*, 1374*c* and dampener 1428 are not parallel and may be spaced apart from one another. This defines a movement space where the dampener 1428 includes additional room to deform before abutting against the wall of the bumper 1374*a*, 1374*b*, 1374*c* (see FIGS. 14B and 16), e.g., to increase or maximize the deflection for the dampeners, which may allow the dampeners to absorb more vibration than in other configurations. Additionally, the angled face of the dampener-facing side of the bumper may help to re-seat the dampeners 1428 as they deflect or move during use or transport of the unit. For example, the angled surface slopes downwards to encourage the dampeners 1428 to slide back into position.

With reference to FIGS. 15A and 15B, the pump housing 1244 is integrally formed to define a gear housing that supports a drive element of the drive assembly 1122, such as one or more gears, a motor, a linkage, and/or gear shaft. More specifically, the second pump housing 1244*b* may include an outer wall 1258 that may be defined as a continuous wall and extend around the perimeter to define both a drive element or gear element compartment 1260 and a pump chamber 1246. The gear compartment 1260 may be shaped and sized to receive various elements of the drive assembly 1122 and/or the pump assembly 1123. The gear compartment 1260 may be connected to the pump chamber 1246 such that without a sealing element, such as a component of the pump assembly 1122, fluid could flow between the gear compartment 1260 and the pump chamber 1246.

The outer wall 1258 transitions to define the outer perimeter of the second gear housing 1244*b*, the outer wall 1258 may form a pump extension 1262, which may extend from a portion of the outer wall 1258. The pump extension 1262 includes an outer wall and defines a pump chamber 1246 therein. The pump chamber 1246 may be open on either end, with one end open to the gear compartment 1260 and the other end, a piston end 1268, may form a terminal end of the pump chamber 1246 that extends away from the outer wall 1258.

Optionally, the pump housing 1244*b* may include one or more coupling features, such as a pump plate 1264 and/or one or more fastening brackets. The pump plate 1264 may be formed at the piston end 1268 of the pump chamber 1246 or as shown in FIGS. 12B, may be slightly set back form the piston end 1268, such a portion of the pump extension 1262 extends past the pump plate 1264. However, in different embodiments, the configuration and orientation of the pump plate 1264 may be different.

Fastening sleeves 1266*a*, 1266*b* may be configured to extend parallel to the pump chamber 1246 and pump extension 1262, such that fasteners that may be used to secure a fitting to the pump extension 1262 may be configured to extend in the same direction of the force generated by the pump assembly 1123 during operation. In one embodiment, the fastening sleeves 1266*a*, 1266*b* may define cavities or recesses configured to receive a fastener, but in other configurations may be differently configured.

With continued reference to FIGS. 15A and 15B, the pump housing 1244 may include one or more fastening supports 1256, such as protrusions or brackets that may receive one or more fasteners to secure the pump housing 1244 together, e.g., secure the first pump housing 1244*a* to the second pump housing 1244*b*. The pump housing 1244*b* may also include one or more mount supports 1280 to couple the pump housing 1244*b* and/or components of the drive assembly 1122 and pump assembly 1123 to the base 1104. In one example, the mount supports 1280 may include a first arm 1282 and a second arm 1284, where the two arms 1282, 1284 may be configured to be received around a mount, e.g., rubber mount. In one example the second arm 1284 may include a recess 1286 defined on a top surface facing towards the first arm 1282. The recess 1286 may be configured to receive a portion of the mount, as discussed in more detail herein. The two arms 1282, 1284 may extend parallel to one another and may extend from the outer wall 1258 of the pump housing 1244*b*, e.g., extend perpendicular from the sidewall of the pump housing 1244*b*. In one example, the first arm 1282 may have a small width than the second arm 1284, however, in other configurations the arms 1282, 1284 may be differently configured. The pump housing 1244*b* may include three sets of mount supports 1280, each include two arms, with two sets extending from the outer wall 1258 and one set extending from a formed bracket 1288 extending downwards from a top edge of the pump housing 1244*b*. The number and configuration of the pump mounts 1280 may be varied based on the desired configuration of the pump assembly 1123, drive assembly 1122, and housing support.

With reference to FIG. 16, one or more bumpers 1374*a*, 1374*b*, 1374*c* may extend upwards from the interior surface 1376. The bumpers 1374*a*, 1374*b*, 1374*c* may be shaped as slightly angled or curved walls, such as a U shape and may have a height to be less than, e.g., shorter than, isolators for the pump assembly 1123, as discussed in more detail below. The bumpers 1374*a*, 1374*b*, 1374*c* may be positioned around, e.g., curved around, an isolator aperture 1386*a*, 1386*b*, 1386*c* and in some instances there may be three isolator aperture 1386*a*, 1386*b*, 1386*c*. Similarly, there may be one or more foot apertures 1380*a*, 1380*b*, 1380*c*, 1380*d* configured to receive a portion of a foot, e.g., rubber foot. The foot apertures 1380*a*, 1380*b*, 1380*c*, 1380*d* may define a passage through the lower base 1124.

With reference to FIG. 16, one or more drain apertures 1382*a*, 1382*b*, 1382*c*, 1382*d* may be defined through the lower housing 1124. The drain apertures 1382*a*, 1382*b*, 1382*c*, 1382*d* are configured to enable fluid to exit the base compartment 1105 through the lower housing 1124. In one embodiment, each of the drain apertures 1382*a*, 1382*b*, 1382*c*, 1382*d* may be positioned adjacent to a foot mount 1380*a*, 1380*b*, 1380*c*, 1380*d* or other interior feature formed on the lower housing 1124 and preferably may be positioned such that the drain apertures 1382*a*, 1382*b*, 1382*c*, 1382*d* are against the perimeter edge of the interior surface 1376 and optionally partially concealed by the foot mount. The positioning of the drain apertures 1382*a*, 1382*b*, 1382*c*, 1382*d* in this manner may help to reduce noise from escaping through the lower housing 1124 as the fastener bosses 1384*a*, 1384*b*, 1384*c*, 1384*d* may act as blocking members to prevent or absorb sound waves from reaching and then exiting the drain apertures 1382*a*, 1382*b*, 1382*c*, 1382*d*. It should be noted that the number and positioning of the drain aperture 1382*a*, 1382*b*, 1382*c*, 1382*d* may be varied as desired and in some examples, the oral irrigator 1000 may include a single drain aperture or may include more than those illustrated. However, in many conventional oral irrigator units, a single centrally located drain hole may be used, but in such instances, the hole may cause noise to escape the housing, which h may increase the overall noise experienced by a user.

Figure 17:
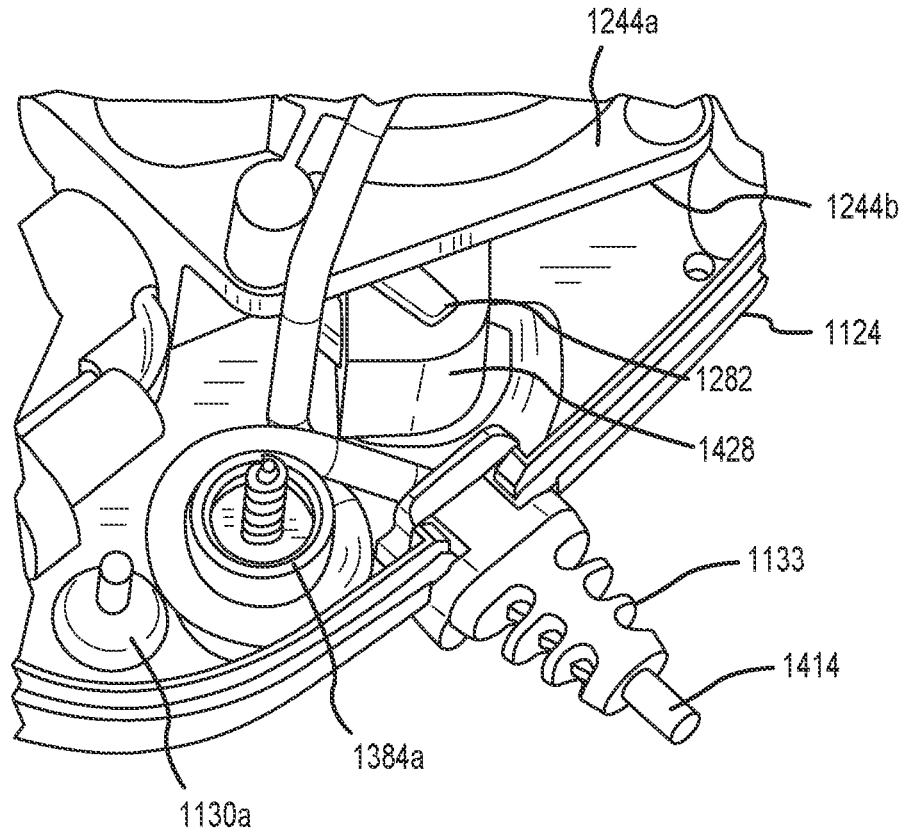
FIG. 17 is a partial isometric view of the oral irrigator of FIG. 12.

FIG. 17 shows a partial view of an example of an isolator assembly. The arm 1282 is shown received in the damper 1428. The isolator may dampen vibrations or noises generated by the pump 1232 and/or drive assembly 1233, thereby making the operation of the oral irrigator 100 more quiet than it would be without the isolator assembly. Also shown in FIG. 17 is an electrical cord 1414 may be coupled to the strain relief 1133 and may be wrapped around the boss 1384*a* such that it extends around the surface of the boss 1384*a* and under its own self to then extend to couple to the circuit board and/or motor, e.g., to provide power to the circuit board. In other examples, the electrical cord 1414 may be otherwise secured to the boss 1384*a*, which may function as a cord anchor, e.g., by wrapping around the surface of the boss 1384*a* and having the two ends then wrap around each other and be secured together.

Conclusion

Any description of a particular component being part of a particular embodiment, is meant as illustrative only and should not be interpreted as being required to be used with a particular embodiment or requiring other elements as shown in the depicted embodiment.

All relative and directional references (including top, bottom, side, front, rear, and so forth) are given by way of example to aid the reader's understanding of the examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

The present disclosure teaches by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. An oral irrigator comprising:
   a housing;
   a drive assembly positioned within the housing;
   a pump assembly coupled to the drive assembly; and
   an isolator assembly coupled to at least one of the drive assembly or the pump assembly and configured to dampen vibrations generated by either or both of the drive assembly or the pump assembly, the isolator assembly comprising:
   a chassis operably coupled to a portion of at least one of the drive assembly or the pump assembly;
   an engagement arm coupled to and extending outwards from the chassis; and
   a dampener positioned between the chassis and a portion of the housing, the dampener comprising a pocket defined therein and configured to support the isolator assembly within the housing, wherein the engagement arm engages an engagement surface of the dampener separate from a pocket surface defining the pocket,
   wherein the engagement arm comprises a first engagement arm and a second engagement arm, wherein the first engagement arm contacts the engagement surface of the dampener and the second engagement arm is positioned adjacent to the pocket surface of the dampener.

2. The oral irrigator of claim 1, wherein the engagement surface forms an exterior surface of the dampener.

3. The oral irrigator of claim 2, wherein the exterior surface is a top surface of the dampener and is positioned above the pocket surface.

4. The oral irrigator of claim 1, wherein the first engagement arm is coupled to the dampener at a location other than the pocket.

5. The oral irrigator of claim 1, wherein the second engagement arm is positioned within the pocket and the engagement surface is positioned above the pocket such that the first engagement arm is positioned above the pocket.

6. The oral irrigator of claim 1, wherein the housing comprises a mounting surface and the dampener includes a mounting head received through an aperture within the mounting surface and the dampener supports the chassis above the mounting surface.

7. The oral irrigator of claim 1, wherein the chassis is operably coupled to at least one of:

a drive shaft of the drive assembly;

one or more gears of the drive assembly;

a connecting arm of the pump assembly; or a piston of the pump assembly.

8. The oral irrigator of claim 1, further comprising a stop coupled to at least one of the dampener or the engagement arm and configured to limit motion of the engagement arm relative to the dampener in at least one direction.

9. The oral irrigator of claim 1, wherein the pocket is a first pocket and the dampener comprises a second pocket, wherein the engagement surface is formed in the second pocket and the first engagement arm is at least partially received within the second pocket.

10. An oral irrigator comprising:

a housing;

a vibration generating component positioned within the housing; and an isolator assembly coupled to the vibration generating component comprising:

a chassis coupled to the vibration generating component;

an engagement arm coupled to the chassis; and a dampener positioned between the chassis and the housing, wherein the engagement arm engages a top surface of the dampener and a bottom surface of the dampener engages the housing, wherein the engagement arm comprises a first engagement arm and a second engagement arm, wherein the first engagement arm engages the top surface of the dampener and the second engagement arm engages another surface of the dampener that is not the top surface.

11. The oral irrigator of claim 10, wherein the vibration generating component comprises a portion of a drive assembly or a pump assembly for the oral irrigator.

12. The oral irrigator of claim 10, wherein the dampener further comprises a pocket defined through a sidewall thereof.

13. The oral irrigator of claim 12, wherein the second engagement arm is received at least partially within the pocket.

14. The oral irrigator of claim 13, wherein a thickness of the second engagement arm is less than a height of the pocket.

15. An oral irrigator comprising:

a substrate;

a chassis comprising an engagement arm;

a vibration generating component supported by the chassis; and a dampener separating the chassis from the substrate to reduce transfer of vibrations from the vibration generating component to the substrate, the dampener including a body, and first and second slots defined on a side of the body; wherein a portion of the chassis is received in the first slot; and wherein the second slot is positioned between the first slot and the substrate to reduce transfer of vibrations to the substrate, wherein the engagement arm comprises a first engagement arm, wherein the chassis further includes a second engagement arm, and wherein a portion of the body of the dampener is positioned between the first engagement arm and the second engagement arm.

16. The oral irrigator of claim 15, wherein the first slot and the second slot form a continuous space in the side of the body of the dampener such that the portion of the chassis occupies the first slot and the second slot is positioned directly beneath the portion of the chassis.

17. The oral irrigator of claim 15, wherein the portion of the chassis comprises a portion of the engagement arm.

\* \* \* \* \*